United States Patent
Inoue et al.

(10) Patent No.: US 9,347,784 B2
(45) Date of Patent: May 24, 2016

(54) VEHICLE INFORMATION PROVIDING DEVICE

(71) Applicant: Nissan Motor Co., Ltd., Yokohama, Kanagawa (JP)

(72) Inventors: Hirofumi Inoue, Yamato (JP); Daisuke Saito, Ebina (JP); Toshiro Muramatsu, Zushi (JP)

(73) Assignee: Nissan Motor Co., Ltd., Yokohama (JE)

( * ) Notice: Subject to any disclaimer, the term of this patent is extended or adjusted under 35 U.S.C. 154(b) by 0 days.

(21) Appl. No.: 14/653,479

(22) PCT Filed: May 31, 2013

(86) PCT No.: PCT/JP2013/065165
§ 371 (c)(1),
(2) Date: Jun. 18, 2015

(87) PCT Pub. No.: WO2014/103399
PCT Pub. Date: Jul. 3, 2014

(65) Prior Publication Data
US 2015/0308848 A1  Oct. 29, 2015

(30) Foreign Application Priority Data

Dec. 27, 2012  (JP) .................................. 2012-284272

(51) Int. Cl.
*G01C 21/34* (2006.01)
*B60L 11/18* (2006.01)
(Continued)

(52) U.S. Cl.
CPC ......... *G01C 21/3492* (2013.01); *B60L 11/1838* (2013.01); *G01C 21/3461* (2013.01); *G01C 21/3469* (2013.01); *G01C 21/3484* (2013.01); *G01C 21/36* (2013.01); *G08G 1/0112* (2013.01); *G08G 1/0129* (2013.01);
(Continued)

(58) Field of Classification Search
CPC ........... G06Q 10/00; G06Q 20/18; H02J 7/00; B60L 11/18; B60L 11/1838; B60L 2240/70; B60L 15/00; B60S 5/06; B06Q 10/02; G01C 21/3492; G01C 21/34
See application file for complete search history.

(56) References Cited

U.S. PATENT DOCUMENTS 8,996,213 B2 * 3/2015 Ishikawa ............. B60L 15/2045
701/22
9,193,277 B1 * 11/2015 Penilla ................... G06Q 20/18
(Continued)

FOREIGN PATENT DOCUMENTS

| JP | 2000-193474 A | 7/2000 |
| JP | 2002-196665 A | 7/2002 |

(Continued)

*Primary Examiner* — Behrang Badii
(74) *Attorney, Agent, or Firm* — Global IP Counselors, LLP

(57) ABSTRACT

A vehicle information providing device provides route information to vehicles. The vehicle information providing device has a history information accumulation unit that sequentially acquires at least one of driving location information, power consumption information and charging location information from vehicle-mounted devices of a plurality of vehicle, and accumulates this as driving history information. The vehicle information providing device has a presentation information provision unit that provides information regarding a presentation route in which the information regarding the presentation route is presented in a form such that routes in a vicinity of the private location cannot be identified, when the presentation route is determined to include at least one private location.

8 Claims, 20 Drawing Sheets

(51) Int. Cl.
*G09B 29/10* (2006.01)
*G08G 1/01* (2006.01)
*G01C 21/36* (2006.01)
*G06Q 10/00* (2012.01)

(52) U.S. Cl.
CPC ........ *G09B 29/106* (2013.01); *B60L 2240/622* (2013.01); *B60L 2240/70* (2013.01); *B60L 2250/12* (2013.01); *B60L 2250/16* (2013.01); *B60L 2260/52* (2013.01); *B60L 2260/54* (2013.01); *G06Q 10/00* (2013.01); *Y02T 10/7005* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/161* (2013.01); *Y02T 90/162* (2013.01); *Y02T 90/163* (2013.01)

(56) References Cited

U.S. PATENT DOCUMENTS

| | | | |
|---|---|---|---|
| 2015/0134546 A1* | 5/2015 | Penilla | G06Q 20/18 705/305 |
| 2015/0177009 A1* | 6/2015 | Saito | B60L 3/00 701/424 |

FOREIGN PATENT DOCUMENTS

| JP | 2010-286460 A | 12/2010 |
|---|---|---|
| JP | 2011-38845 A | 2/2011 |
| JP | 2011-174753 A | 9/2011 |
| JP | 2011-185785 A | 9/2011 |
| JP | 2011-229362 A | 11/2011 |
| JP | 2012-181183 A | 9/2012 |

* cited by examiner

VEHICLE INFORMATION PROVIDING DEVICE

CROSS-REFERENCE TO RELATED APPLICATIONS

This application is a U.S. National stage application of International Application No. PCT/JP2013/065165, filed May 31, 2013, which claims priority to Japanese Patent Application No. 2012-284272 filed in Japan on Dec. 27, 2012. The entire disclosure of the Japanese Patent Application No. 2012-284272 is hereby incorporated herein by reference.

BACKGROUND

1. Field of the Invention

The present invention relates to an information providing device for a vehicle that provides information such as power consumption and charging hubs when driving a vehicle with an electric motor as a drive source to a destination.

2. Background Information

Conventionally, a technology is known in which, in a vehicle with an electric motor as a drive source, a route to the destination is searched, and the power to be consumed when driving a route, based on the power consumption for the entire length of the searched route as well as per a predetermined unit distance (hereinafter, also referred to as the theoretical performance of the vehicle), is predicted (refer to, for example, Japanese Laid-Open Patent Application No. 2011-38845). In the technology of Japanese Laid-Open Patent Application No. 2011-38845, when the predicted power consumption is greater than the charged amount of the battery for running the vehicle, the route and information regarding the charging points, which are points at which the battery for running the vehicle can be charged, are provided.

SUMMARY

Since the conventional technology described above predicts power consumption based on the theoretical performance of the vehicle, for example, when there is a deviation between the actual performance and the theoretical performance of the vehicle, there is the possibility that the predicted value of power consumption will deviate from the actual power consumption. Consequently, there were cases in which the above-described conventional technology could not appropriately provide the necessary information to the user. In view of the point described above, an object of the present invention is to provide information regarding the power consumption and information regarding charging hubs that are in accordance with the actual environment.

In order to achieve the above-described object, in the present invention, at least the driving location information, the power consumption information, or the charging position information is sequentially acquired from a vehicle-mounted device in a vehicle with an electric motor as the drive source, and this information is accumulated as the driving history information; when referring to the accumulated driving history information and determining a route to present, a route that is identical or similar to a planned route is determined and presented, and at least one piece of information regarding the power consumption or the charging hubs corresponding to the presented route is provided. Also, upon providing such information, when a determination has been made that a private location has been included in the presentation route, the information is provided in a form such that routes in the vicinity of the private location cannot be identified.

According to the present invention, power that is consumed when a vehicle travels and charging hubs are determined with reference to the driving history information, that is, the information that has been acquired while the vehicle actually travels; when providing this information, the presentation is in a form such that the routes in the vicinity of a private location, which is determined to pertain to privacy, cannot be identified; therefore, providing information regarding the power consumption in accordance with the actual environment and information regarding charging hubs while keeping private locations unknown is possible.

BRIEF DESCRIPTION OF THE DRAWINGS

Referring now to the attached drawings which form a part of this original disclosure.

DETAILED DESCRIPTION OF THE EMBODIMENTS

Figure 1:
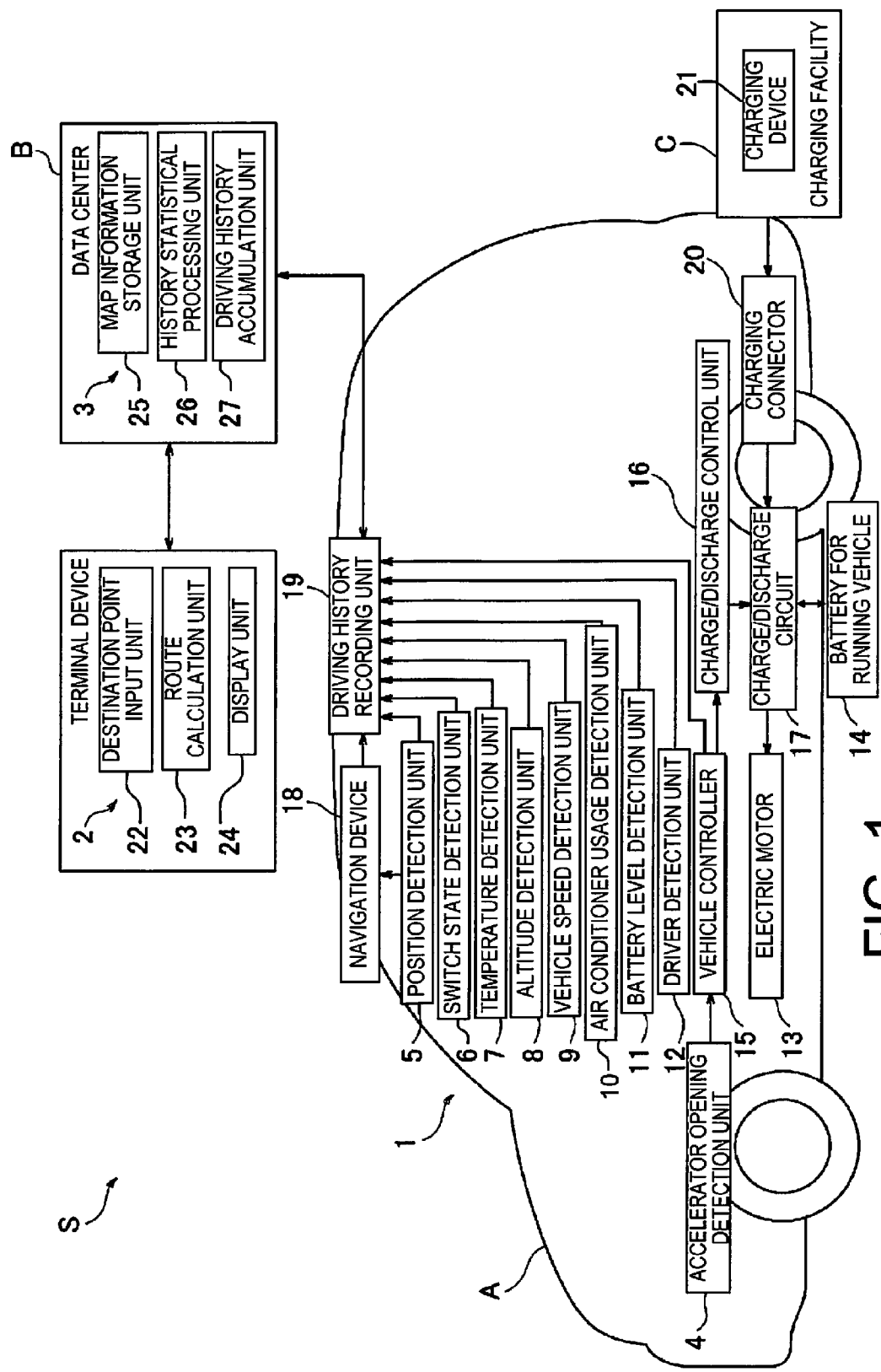
FIG. 1 is a view illustrating a schematic overview of a vehicle information provision system S.

FIG. 1 is a view illustrating a schematic overview of a vehicle information provision system S according to the present embodiment. As illustrated in FIG. 1, the vehicle information provision system S of the present embodiment comprises a vehicle-mounted device 1 that is mounted to a plurality of vehicles A with an electric motor 13 as a drive source, a terminal device 2 possessed by the owner of the vehicle A, and an information providing device for vehicle 3 present in a data center B. The vehicle-mounted device 1 and the vehicle information providing device 3, as well as the terminal device 2 and the vehicle information providing device 3, send and receive various types of information via a communication path. Examples of the communication paths include a cellular telephone network, a wireless LAN network, a DSRC (Dedicated Short-Range Communications) network, a power line communication network, etc. For example, the configuration can be such that both the vehicle-mounted device 1 and the vehicle information providing device 3 store various types of information in a removable storage medium, such as a flash memory, and send and receive the various types of stored information via a terminal that has a communication function.

The vehicle-mounted device 1 comprises an accelerator opening detection unit 4, a position detection unit 5, a switch state detection unit 6, a temperature detection unit 7, an altitude detection unit 8, a vehicle speed detection unit 9, an air conditioner usage detection unit 10, a battery level detection unit 11, and a driver detection unit 12.

The accelerator opening detection unit 4 detects the accelerator opening of a host vehicle A. Then, the accelerator opening detection unit 4 outputs the information regarding the detection results to a vehicle controller 15 described below. The position detection unit 5 detects the current position of the host vehicle A (for example, the latitude and longitude) based on a GPS signal transmitted by a GPS (Global Positioning System) satellite. Then, the position detection unit 5 will output the information regarding the detection results to a navigation device 18 described below.

The switch state detection unit 6 detects the switch state of an ignition switch of the host vehicle A. The switch states of the ignition switch may be, for example, an ON state and an OFF state. The switch state detection unit 6 outputs the information regarding the detection results to a driving history recording unit 19 described below. The temperature detection unit 7 detects the temperature of the current position of the host vehicle A. The temperature detection unit 7 outputs the information regarding the detection results to the driving history recording unit 19 described below.

The altitude detection unit 8 detects the altitude of the current position of the host vehicle A. Then, the altitude detection unit 8 outputs the information regarding the detection results to the driving history recording unit 19 described below. The vehicle speed detection unit 9 detects the vehicle speed of the host vehicle A. Then, the vehicle speed detection unit 9 outputs the information regarding the detection results to the driving history recording unit 19 described below. The air conditioner usage detection unit 10 detects the air conditioner usage of the host vehicle A. The air conditioner usage is, for example, the power that is consumed by the air conditioner. The air conditioner usage detection unit 10 outputs the information regarding the detection results to the driving history recording unit 19 described below.

The battery level detection unit 11 detects the battery level of the vehicle A. In the present embodiment, the battery level can be the level of the battery 14 for running the vehicle in order to supply electric power to the electric motor 13, which is the drive source. Then, the battery level detection unit 11 outputs the information regarding the detection results to the driving history recording unit 19 described below. The driver detection unit 12 detects the driver ID (Identification) for the driver of the host vehicle A. A driver ID can be, for example, a number, etc., for uniquely identifying the driver. Then, the driver detection unit 12 outputs the information regarding the detection results to the driving history recording unit 19 described below.

Additionally, the vehicle-mounted device 1 comprises a vehicle controller 15, a charge/discharge control unit 16, a charge/discharge circuit 17, a navigation device 18, and a driving history recording unit 19.

The vehicle controller 15 acquires the information (accelerator opening) output by the accelerator opening detection unit 4. Then, the vehicle controller 15 outputs the acquired information to the driving history recording unit 19. The vehicle controller 15 outputs a control command to the charge/discharge control unit 16 to supply the electric power that corresponds to the accelerator opening to the electric motor 13, based on the acquired information (accelerator opening).

The charge/discharge control unit 16, following the control command from the vehicle controller 15, outputs a control command to the charge/discharge circuit 17 to supply the electric power that is stored by the battery 14 for running the vehicle to the electric motor 13. Additionally, the charge/discharge control unit 16 detects the charging state and the charging time of the battery 14 for running the vehicle. Charging states may be, for example, the distinction between currently charging and not currently charging. The charging time may be, for example, the time from starting charging to finishing charging. Then, the charge/discharge control unit 16 outputs the information regarding the detection results to the driving history recording unit 19.

The charge/discharge circuit 17 supplies the electric power stored by the battery 14 for running the vehicle to the electric motor 13, following the control command from the charge/discharge control unit 16. The electric motor 13 thereby generates a drive force. The charge/discharge circuit 17 connects with a charging device 21 via a charging connector 20. This type of charging device 21 may be, for example, a device for supplying electric power to charge the battery 14 for running the vehicle, which is provided in a charging facility C that is provided outside the vehicle A. Then, electric power from the charging device 21 is supplied to the charge/discharge circuit 17 with the charging connector 20 being connected to the charging device 21, and the battery 14 for running the vehicle is thereby charged.

The navigation device 18 acquires the information (the latitude and longitude (the current position of the vehicle A)) that has been output by the position detection unit 5. Then, the navigation device 18 presents to the driver guide information for guiding the vehicle A along a route from a departure point $P_O$ to a destination point $P_D$, which are set by the driver, based on the acquired information (the latitude and longitude (the current position of the vehicle A)). Additionally, the navigation device 18 outputs the acquired information and the route to the driving history recording unit 19.

The driving history recording unit 19 executes a driving history information recording operation, based on the information output from the various detection units 6-12, the vehicle controller 15, the charge/discharge control unit 16, and the navigation device 18.

In the driving history information recording operation, a first piece of driving history information and a second piece of driving history information described below are recorded. Then, the driving history recording unit 19 transmits the recorded first piece of driving history information and the second piece of driving history information to the vehicle information providing device 3. The details regarding the first piece of driving history information, the second piece of driving history information, as well as the driving history information recording operation, are described below.

On the other hand, the terminal device 2 comprises a destination point such as an input unit 22, a route calculation unit 23, and a display unit 24. The terminal device 2 may be, for example, a mobile phone terminal, a personal computer, etc. possessed by the owner of the vehicle A.

The destination point such as the input unit 22 receives an input regarding the departure point $P_O$, the destination point $P_D$, the battery level (for example, the battery level of the vehicle A that is possessed by the user), and the driver ID (for example, the driver ID that identifies the user) from the user of the terminal device 2. Then, the destination point such as the input unit 22 outputs the received information regarding the departure point $P_O$, the destination point $P_D$, the battery level, and the driver ID to the route calculation unit 23.

The route calculation unit 23 executes a route provision operation based on the information output from the destination point such as the input unit 22 and, specifically, information regarding the departure point $P_O$ and the destination point $P_D$. In the route provision operation, the route calculation unit 23 transmits the search request for the presentation route (hereinafter also referred to as the presentation route search request) to the vehicle information providing device 3. Next, the route calculation unit 23 receives the information regarding the presentation route, the power that has been consumed when driving the presented route, and the location of charging facilities C (hereinafter also referred to as charging hubs), which will be traversed when driving along the presented route, from the vehicle information providing device 3. The route calculation unit 23, upon receiving the information from the vehicle information providing device 3, outputs a control signal for displaying the received information to the display unit 24. The details regarding the route provision operation will be described below. In the present embodiment, an example is described in which the terminal device 2 executes the route provision operation, but another configuration may also be used. That is, for example, the configuration may be such that the position detection unit 5, the route calculation unit 23, and the display unit 24 are realized by a navigation device 18 provided to the vehicle A, and the route provision operation is executed therewith.

Figure 2:
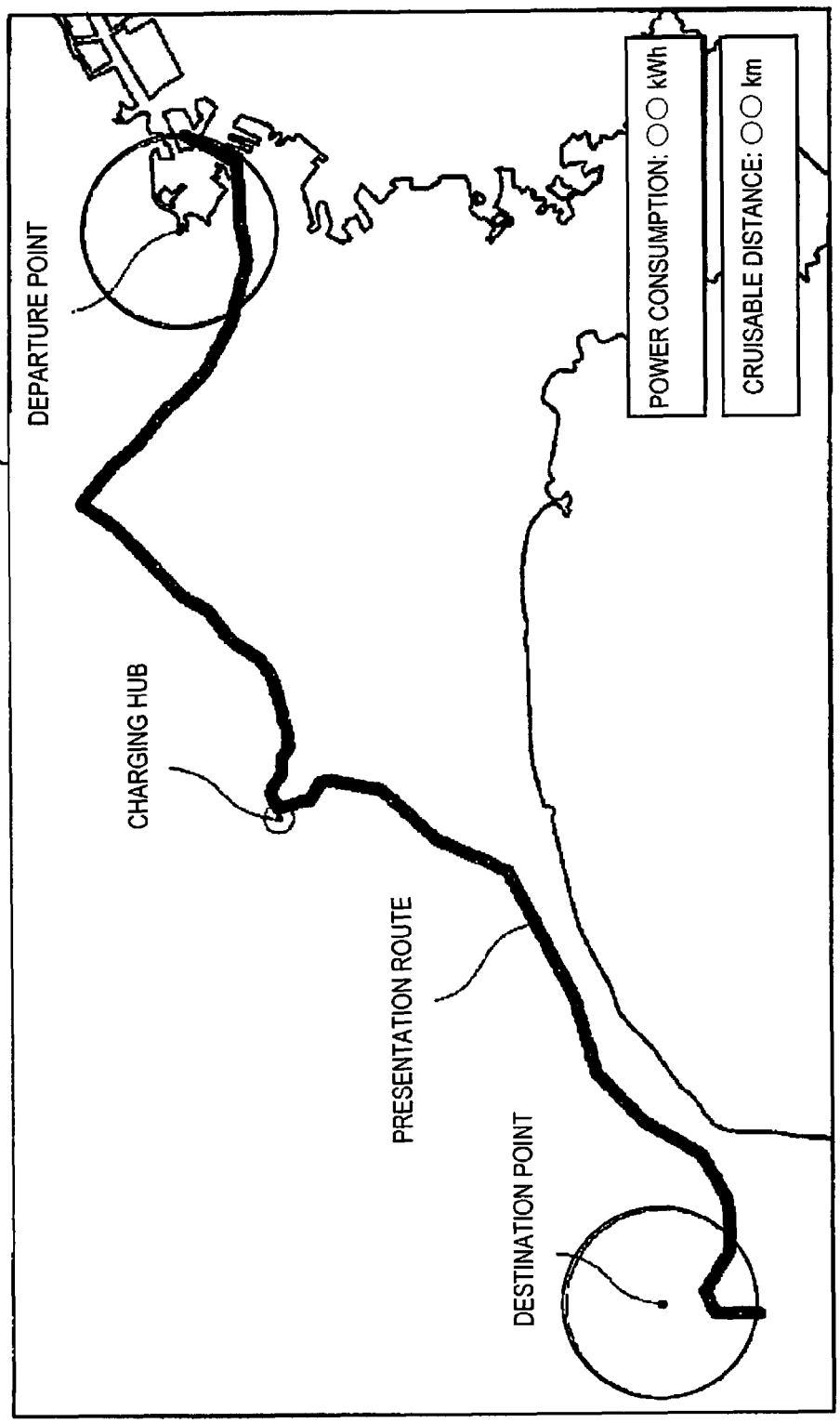
FIG. 2 is a view illustrating one example of the contents displayed by a display unit.

Here, FIG. 2 is a view illustrating one example of the contents displayed by a display unit 24. The display unit 24 displays on the display screen information regarding the presented route, the power that has been consumed when driving along the presented route, and the charging hubs that will be traversed when driving the along presented route, following the control command being output by the route calculation unit 23, as illustrated in FIG. 2. The user of the terminal device 2 can thereby confirm beforehand the power consumption and charging hubs when driving the vehicle A to the destination point.

Returning to FIG. 1, the vehicle information providing device 3 comprises a map information storage unit 25, a driving history accumulation unit 26, and a historical statistics processing unit 27.

The map information storage unit 25 stores map information of the region where the vehicle A is traveling. Map information may be, for example, information such as nodes and links that represent a road network, the locations of charging facilities C for charging the battery 14 for running the vehicle 4 provided to the vehicle A, toll roads, and the locations of facilities attached to toll roads.

The driving history accumulation unit 26 executes the history information accumulation operation based on the first piece of history information and the second piece of driving history information that are transmitted from the vehicle-mounted device 1. Specifically, in the history information accumulation operation, the driving history accumulation unit 26 sequentially receives (acquires) the first piece of driving history information and the second piece of driving history information that are transmitted by the vehicle-mounted device 1. Then, the driving history accumulation unit 26 accumulates the received first piece of driving history information and the second piece of driving history information as the driving history information.

The historical statistics processing unit 27 executes driving history statistical processing by referencing the presentation route search request transmitted from the terminal device 2, the map information stored in the map information storage unit 25, and the driving history information (the first piece of driving history information, the second piece of driving history information) accumulated by the driving history accumulation unit 26.

In the driving history statistical processing step, first, the historical statistics processing unit 27 searches (acquires) a planned route from a departure point $P_O$ to the destination point $P_D$, referencing the map information that is stored by the map information storage unit 25, based on the presentation route search request that is transmitted by the route calculation unit 23. A planned route may be any route that is able to reach a destination point $P_D$ from a departure point $P_O$ and is not particularly limited; for example, a route that can be traveled from a departure point $P_O$ to a destination point $P_D$ in the shortest amount of time can be set.

Next, in the driving history statistical processing step, the historical statistics processing unit 27 selects the same or a similar presentation route as the searched (acquired) planned route by referencing the driving history information (the first driving piece of history information) that is accumulated by the driving history accumulation unit 26. This type of method for selecting a presentation route will be described below. Next, the historical statistics processing unit 27 selects the power that actually has been consumed by the vehicle A, as well as the charging hubs that will be traversed when driving along the presented route, by referencing the driving history information (the first piece of driving history information, the second piece of driving history information) that is accumulated by the driving history accumulation unit 26. Then, the historical statistics processing unit 27 transmits (provides) the selected presentation route, the power consumption, and the charging hub information to the vehicle-mounted device 1. The vehicle-mounted device 1 thereby presents the presentation route, the power that is consumed upon traveling along the presented route, and the charging hubs that will be traversed when driving along the presentation route, based on the information output by the historical statistics processing unit 27. At this time, when the presentation route includes a private location $P_P$, the presentation of the information is carried out in a form such that this type of private location $P_P$ cannot be identified. The details regarding the driving history statistical processing step will be described below.

Travel History Information Recording Operation

Figure 3:
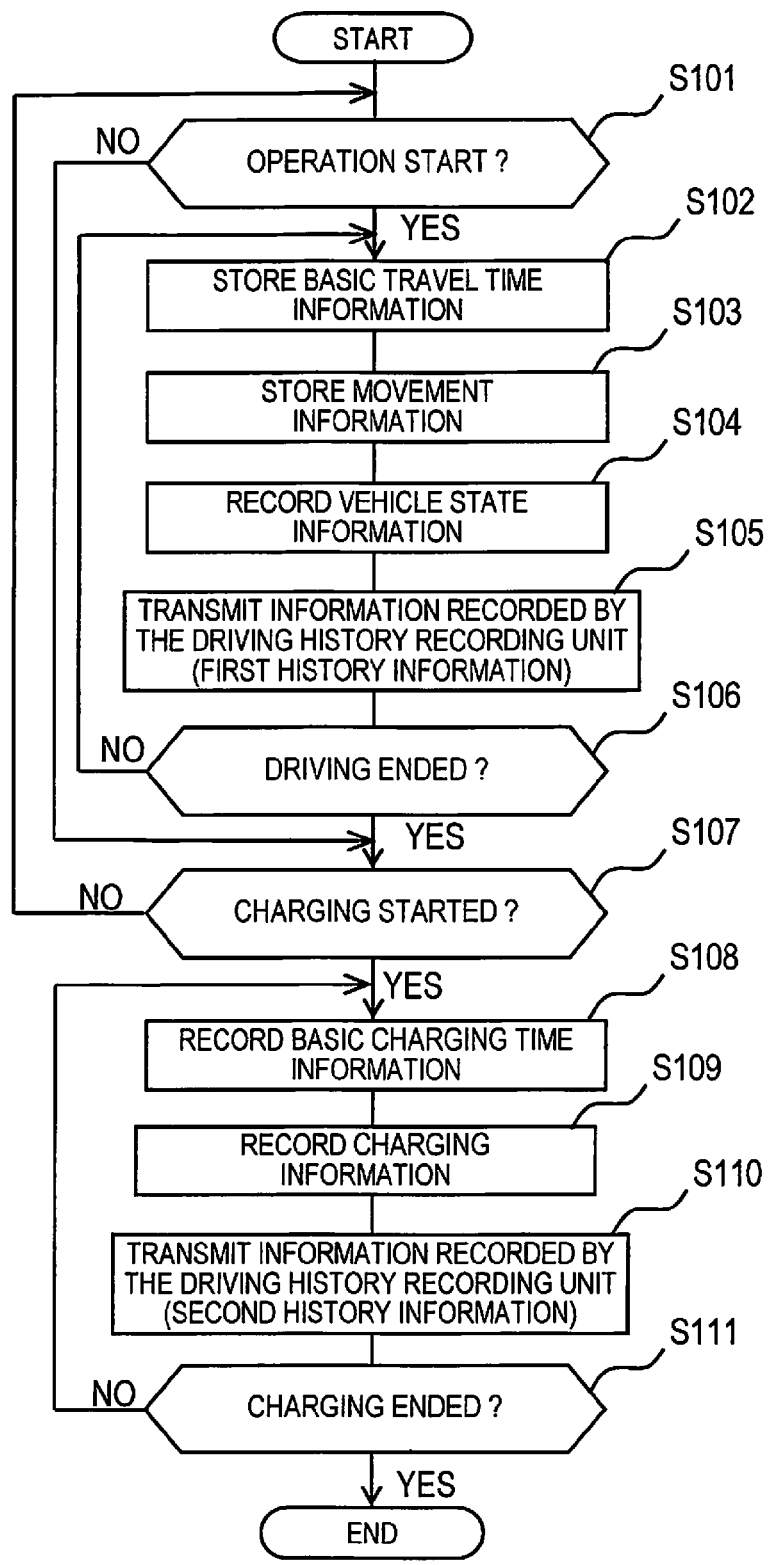
FIG. 3 is a flowchart representing the driving history information recording operation.

Next, the driving history information recording operation that is executed by the driving history recording unit 19 will be described. The driving history recording unit 19 executes a driving history information recording operation each time a predetermined set time (for example, 10 milliseconds) has elapsed. FIG. 3 is a flowchart representing the driving history information recording operation.

In step S101, the driving history recording unit 19 determines whether or not the driver has started driving the vehicle A, as illustrated in FIG. 3. Specifically, the driving history recording unit 19 determines whether or not the ignition switch is in an ON state, based on the information (the switch state of the ignition switch) that is output by the switch state detection unit 6. Then, when a determination is made that the ignition switch is in the ON state (step S101=Yes), the driving history recording unit 19 determines that the driver has started driving the vehicle A, and the operation proceeds to step S102. On the other hand, when a determination is made that the ignition switch is in the OFF state (step S101=No), the driving history recording unit 19 determines that the driver has not started driving the vehicle A, and the operation proceeds to step S107.

When a determination is made that the driver has started driving the vehicle A, the operation proceeds to step S102; in step S102, the driving history recording unit 19 records the vehicle ID information, which specifies the vehicle A, the driver ID information, which is output from the driver detection unit 12, the temperature information, which is output from the temperature detection unit 7, and the current date and time information as the basic travel time information. That is, in the present embodiment, the basic travel time information is information comprising the vehicle ID information, the driver ID information, the temperature information, and the current date and time information.

Next, the operation proceeds to step S103, and the driving history recording unit 19 stores the latitude and longitude information, as well as the altitude information that are output from the position detection unit 5 and the altitude detection unit 8, along with the route information (hereinafter also referred to as the driving location information) as the movement information. That is, in the present embodiment, the movement information includes the latitude and longitude information, the altitude information, and the route information (the driving location information). For example, since the vehicle A can be considered to be traveling along a route that is presented by the navigation device 18, information that is output by the navigation device 18 (route) can be employed as the route.

The operation then proceeds to step S104, and the driving history recording unit 19 records the vehicle speed information, the accelerator opening information, and the air conditioner usage information output from each of the detection units 4, 8, 9, 10 as the vehicle state information. When traveling along the route from the navigation device 18 has been completed, the driving history recording unit 19 includes information regarding the power that was consumed by traveling the route (hereinafter also referred to as the power consumption information) in the vehicle state information to be recorded. That is, in the present embodiment, the vehicle state information included the vehicle speed information, the accelerator opening information, the air conditioner usage information, and the information regarding the power consumption (the power consumption information). As an example of a calculation method, power consumption can be obtained by subtracting the battery level at the time of reaching the destination point $P_D$ from the battery level at the time of departing from the departure point $P_O$ of the route.

The operation then proceeds to step S105, and the driving history recording unit 19 transmits information comprising the basic travel time information, the movement information, and the vehicle state information recorded by the driving history recording unit 19 to the vehicle information providing device 3 as the first piece of driving history information.

The operation then proceeds to step S106, and the driving history recording unit 19 determines whether or not the driver has finished driving the vehicle A. Specifically, the driving history recording unit 19 determines whether or not the ignition switch is in an OFF state, based on the information regarding the switch state of the ignition switch that is output by the switch state detection unit 6. Then, when a determination is made that the ignition switch is in the OFF state (step S106=Yes), the driving history recording unit 19 determines that the driver has finished driving the vehicle A, and the operation proceeds to step S107. On the other hand, when a determination is made that the ignition switch is in the ON state (step S106=No), the driving history recording unit 19 determines that the driver has not finished driving the vehicle A, the operation returns step S102, and the operations of steps S102-S106 are repeatedly executed until a determination is made that the driver has finished driving the vehicle A.

When a determination is made that the driver has finished driving the vehicle A, the operation proceeds to step S107; in step S107, the driving history recording unit 19 determines whether or not the charging of the battery 14 for running the vehicle has been started. Specifically, the driving history recording unit 19 determines whether or not the battery 14 for running the vehicle is in a charging state based on the charging state information from the battery 14 for running the vehicle that is output from the charge/discharge control unit 16. Then, when a determination is made that the battery 14 for running the vehicle is in a charging state (step S107=Yes), the driving history recording unit 19 determines that the battery 14 has started charging, and the operation proceeds to step S108. On the other hand, when a determination is made that the battery 14 for running the vehicle is not in a charging state (step S107=No), the driving history recording unit 19 determines that the battery 14 for running the vehicle has not started charging, the operation returns to step S101, and the operations of steps S101 and S107 are repeatedly executed until driving the vehicle A has been started (step S101=Yes) or the charging of the battery 14 for running the vehicle has been started (step S107=Yes).

When the charging of the battery 14 for running the vehicle is started, the operation proceeds to step S108; in step S108, the driving history recording unit 19 records the temperature information output from the temperature detection unit 7, as well as the current date and time information, as the basic charge time information. That is, in the present embodiment, the basic charge time information includes the temperature information and the current date and time information.

Next, the operation proceeds to step S109, and the driving history recording unit 19 stores the latitude and longitude information output from the position detection unit 5, the battery level detection unit 11, the charge/discharge control unit 16 (hereinafter also referred to as the charging hub information, the charging position information), the charging amount information, and the charging time information as the charging information. That is, in the present embodiment, the charging information includes the latitude and longitude information (the charging hub information, the charging position information), the charging amount information, and the charging time information.

The operation then proceeds to step S110, and the driving history recording unit 19 transmits information comprising the basic charge time information and the charging information recorded by the driving history recording unit 19 to the vehicle information providing device 3 as the second piece of driving history information. At this time, the driving history recording unit 19 transmits the second piece of driving history information, along with the first piece of driving history information that was transmitted in step S105 described above, to the vehicle information providing device 3. The route that the vehicle A traveled is thereby correlated with the charging hubs that were traversed when driving along the route.

The operation then proceeds to step S111, and the driving history recording unit 19 determines whether or not the battery 14 for running the vehicle has finished charging. Specifically, the driving history recording unit 19 determines whether or not the battery 14 for running the vehicle is in a charging state based on the charging state information of the battery 14 for running the vehicle that is output from the charge/discharge control unit 16. Then, when a determination is made that the battery 14 for running the vehicle is not in a charging state (step S111=Yes), the driving history recording unit 19 determines that battery 14 for running the vehicle has finished charging, and the driving history information recording operation ends. On the other hand, when a determination is made that the battery 14 for running the vehicle is in a charging state (step S111=No), the driving history recording unit 19 determines that the battery 14 for running the vehicle has not finished charging, the operation returns to step S108, and the operations of steps S108-S111 are repeatedly executed until a determination is made that the battery 14 for running the vehicle has finished charging.

Route Provision Operation

Figure 4:
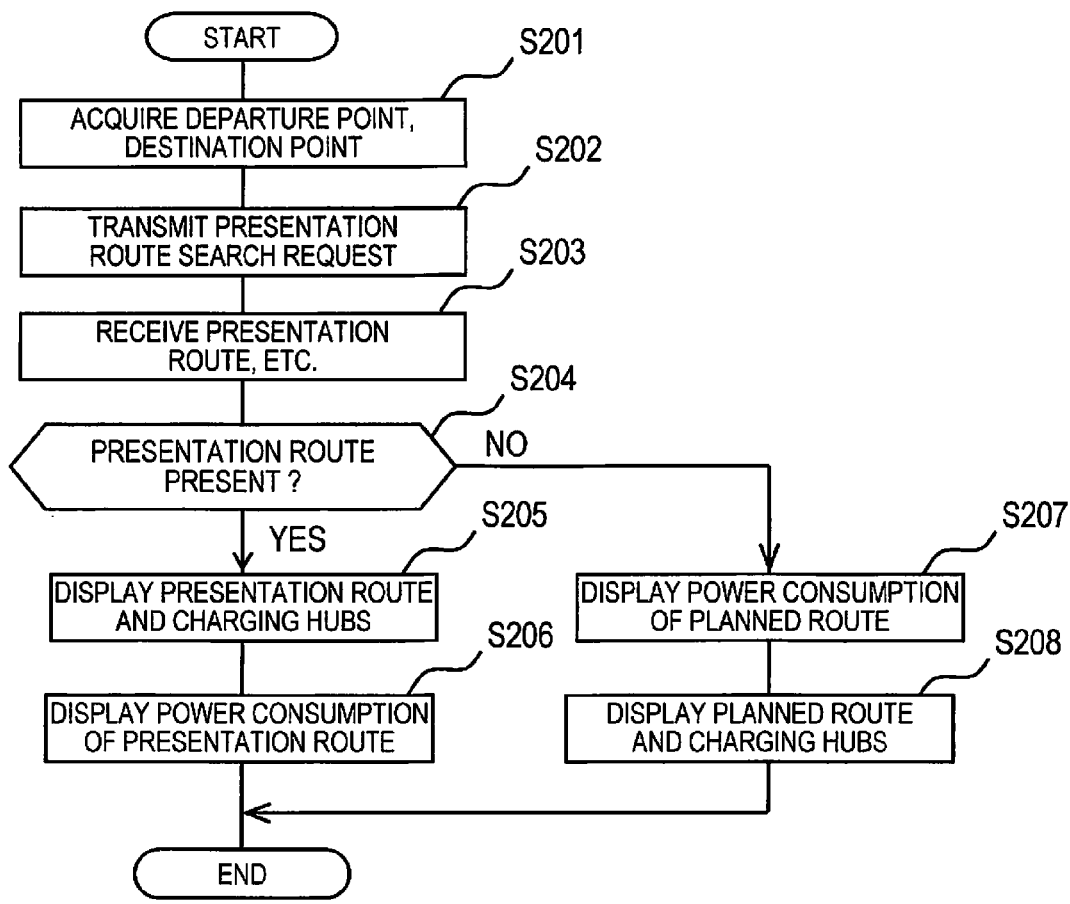
FIG. 4 is a flowchart representing the route provision operation.

Next, the route provision operation that is executed by the route calculation unit 23 will be described. The route calculation unit 23 executes a route provision operation described below when information regarding the departure point $P_O$, the destination point $P_D$, the battery level, and the driver ID are input from the destination point such as the input unit 22. FIG. 4 is a flowchart representing the route provision operation.

First, in step S201, the route calculation unit 23 acquires information regarding the departure point $P_O$, the destination point $P_D$, the battery level, and the driver ID output from the destination point such as the input unit 22, as illustrated in FIG. 4.

The operation then proceeds to step S202, and the route calculation unit 23 transmits a presentation route search request to the vehicle information providing device 3. Specifically, the route calculation unit 23 transmits the presentation route search request, along with information regarding the departure point $P_O$, the destination point $P_D$, the battery level, and the driver ID acquired in step S201 described above, to the vehicle information providing device 3.

Then, in response to the presentation route search request that is output from the route calculation unit 23, the historical statistics processing unit 27 of the vehicle information providing device 3 searches (acquires) the planned route from the departure point $P_O$ to the destination point $P_D$ by referencing the map information that is stored in the map information storage unit 25. Next, the historical statistics processing unit 27 searches for a route that is identical or similar to the planned route (hereinafter referred to as a similar route) by referencing the first piece of driving history information accumulated by the driving history accumulation unit 26 and selects the searched similar route to be the presented route. The method for selecting a presentation route will be described below. The historical statistics processing unit 27 then determines the power that has been consumed when driving the selected presentation route, as well as the charging hubs that will be traversed when driving along the presentation route, by referencing the first piece of driving history information and the second piece of driving history information, which are accumulated by the driving history accumulation unit 26. The method for determining the power consumption and the charging hubs will be described below. Then, the historical statistics processing unit 27 transmits (provides) the selected presentation route, the power consumption, and the charging hub information to terminal device 2. The details regarding the driving historical statistics processing step will be described below. At this time, when the historical statistics processing unit 27 determines that the presentation route includes a private location $P_P$, the information is transmitted (provided) to the terminal device 2 in a form such that this type of private location $P_P$ cannot be identified. For example, when a presentation route cannot be selected (calculated), such as when a corresponding similar route does not exist, the historical statistics processing unit 27 transmits (provides) information regarding the searched planned route, instead of the presentation route information, to the terminal device 2.

The operation then proceeds to step S203, and the route calculation unit 23 receives information including the presentation route information, the power consumption information, and the charging hub information, which are transmitted by the vehicle information providing device 3. If a presentation route cannot be selected in step S202, the route calculation unit 23 receives the planned route information instead of the presentation route information.

The operation then proceeds to step S204, and the route calculation unit 23 determines whether or not the presentation route information was received in step S203. If the route calculation unit 23 determines that the presentation route information has been received (step S204=Yes), the operation proceeds to step S205. On the other hand, if the route calculation unit 23 determines that the planned route information has been received instead of the presentation route information (step S204=No), the operation proceeds to step S207.

If a determination is made that the presentation route information has been received, the operation proceeds to step S205; in step S205, the route calculation unit 23 outputs a control command to the display unit 24 to display the presentation route information and the charging hub information from the information acquired in the above-described step S203 (the presentation route information, the power consumption information, and the charging hub information).

Next, in step S206, the route calculation unit 23 outputs a control command to the display unit 24 to display the power consumption information from the information acquired in the above-described step S203 (the presentation route information, the power consumption information, and the charging hub information), after which the route provision operation ends. A display such as that illustrated in FIG. 2 is thereby displayed on the display screen.

On the other hand, if a determination is made that the presentation route information has not been received, the operation proceeds to step S207; in step S207, the route calculation unit 23 outputs a control command to the display unit 24 to display the planned route information and the charging hub information from the information acquired in the above-described step S203 (the planned route information, the power consumption information, and the charging hub information).

Next, in step S208, the route calculation unit 23 outputs a control command to the display unit 24 to display the power consumption information from the information acquired in the above-described step S203 (the planned route information, the power consumption information, and the charging hub information), after which the route provision operation ends. A display such as that illustrated in FIG. 2 is thereby displayed on the display screen.

History Accumulation Operation

Figure 5:
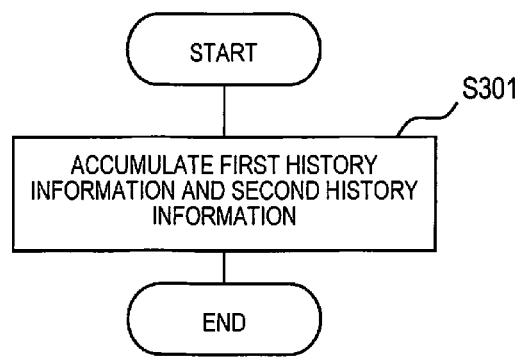
FIG. 5 is a flowchart representing the history accumulation operation.

Next, the history accumulation operation that is executed by the driving history accumulation unit 26 will be described. The driving history accumulation unit 26 executes the history accumulation operation when receiving the first piece of driving history information or the second piece of driving history information from the route calculation unit 23. FIG. 5 is a flowchart representing the history accumulation operation.

In step S301, the driving history accumulation unit 26 accumulates the received first piece of driving history information or the second piece of driving history information as the driving history information, and the history accumulation operation ends, as illustrated in FIG. 5. At this time, the driving history accumulation unit 26 includes information regarding the presence/absence of traffic jams, the day of the week, the season, the weather, the travel time zone, the travel power consumption, and the average speed as the driving history information (the first piece of driving history information, the second piece of driving history information) to be accumulated. For example, the presence/absence of traffic jams on the traveling date/time and along the route, which are included in the first piece of driving history information, can be detected, and the detected information can be used as the information related to the presence/absence of traffic jams. Information regarding the day of the week may be, for example, the day of the week corresponding to the traveling date/time, which is included in the first piece of driving history information. Information regarding the season may be, for example, the season corresponding to the traveling date/time, which is included in the first piece of driving history information. Additionally, the weather on the traveling date/time and at the latitude and longitude, which are included in the first piece of driving history information, can be detected, and the detected information can be used as the information regarding the weather. Information regarding the time zone may be, for example, the time zone corresponding to the traveling date/time, which is included in the first piece of driving history information. Information regarding the travel power consumption may be, for example, the amount of decrease in the battery level per unit of time while traveling, which is included in the first piece of driving history information. Information regarding the average speed may be, for example, the average value of the vehicle speed over a set period of time (for example, 10 minutes), which is included in the first piece of driving history information.

In the present embodiment, an example was described in which the driving history recording unit 19 uses the route information that is output from the navigation device 18 as the route, but another configuration may also be employed. For example, if the route in the first piece of driving history information includes a portion in which the vehicle A traveled a different route, the driving history accumulation unit 26 corrects the above to the route that the vehicle A actually traveled, based on the driving history information (the latitude and longitude), which is accumulated by the driving history accumulation unit 26. The driving history accumulation unit 26 thereby accumulates information regarding the route that the vehicle A actually traveled. A latitude and longitude sequence or a road link string after a common dead reckoning or a latitude and longitude sequence or a road link string after map matching may be employed as the information regarding the actually traveled route. Dead reckoning is location information that is obtained by, for example, correcting GPS latitude and longitude information detected by the position detection unit 5 in view of the speed information provided by the vehicle speed detection unit 9. A method for increasing the correction accuracy by considering gyro-sensor (acceleration sensor) information, which is not diagrammed, is also known. Map matching is known as a method for detecting the most likely location on the road by detecting whether or not one is traveling on a road by looking at both the GPS latitude and longitude information that is detected by the position detection unit 5 or the latitude and longitude after the above-described dead reckoning, as well as the road link, node information, and, if during navigation guiding, the route information, which is possessed by the navigation device 18, and, if on a road, determining which roads have been passed.

Travel History Statistical Processing

Figure 6:
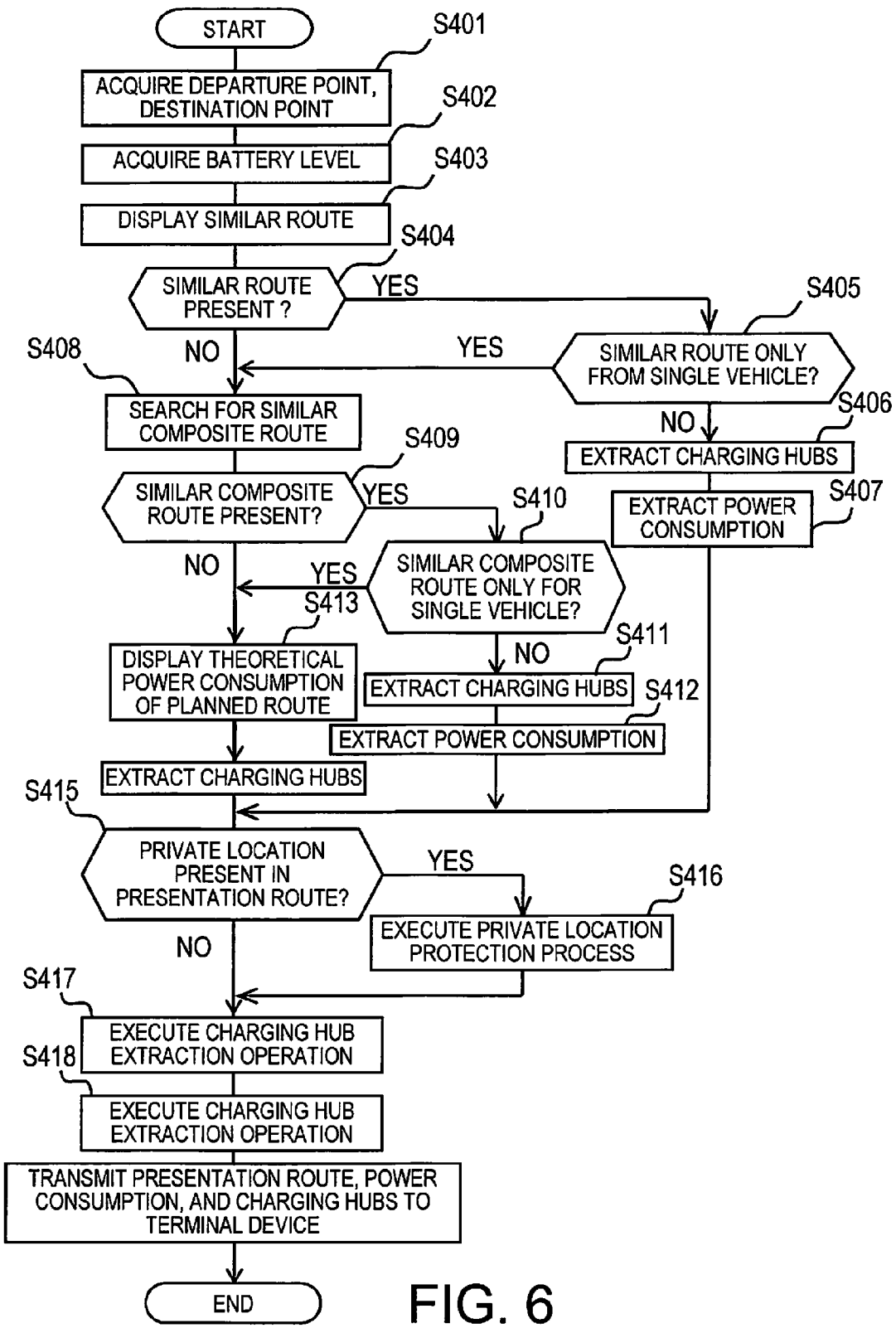
FIG. 6 is a flowchart representing the driving historical statistics processing step.

Next, the driving history statistical processing step that is executed by the historical statistics processing unit 27 will be described. The historical statistics processing unit 27 executes the historical statistics processing step when receiving the presentation route search request that is transmitted by the terminal device 2. FIG. 6 is a flowchart representing the driving historical statistics processing step.

First, in step S401, the historical statistics processing unit 27 acquires the departure point $P_O$ and the destination point $P_D$ from the received presentation route search request, as illustrated in FIG. 6. Next, the historical statistics processing unit 27 searches (acquires) the planned route from the acquired departure point $P_O$ to the destination point $P_D$, based on the map information that is stored by the map information storage unit 25. A planned route may be any route that reaches a destination point $P_D$ from a departure point $P_O$ and is not particularly limited; for example, a route leaving a departure point $P_O$ and reaching a destination point $P_D$ in the shortest amount of time is set.

In the present embodiment, an example was described in which the historical statistics processing unit 27 that is provided to the vehicle information providing device 3 searches for (acquires) a planned route, but another configuration may also be used. For example, the configuration may be such that a navigation device 18 provided to the vehicle-mounted device 1 searches for the planned route. In this case, the navigation device 18 transmits the search results for the planned route to the historical statistics processing unit 27, and the historical statistics processing unit 27 transmits (acquires) the planned route that has been transmitted from the navigation device 18.

The operation then proceeds to step S402, and the historical statistics processing unit 27 acquires the battery level information from the received presentation route search request. The method for acquiring the battery level information may be a method for acquiring the battery level detection unit 11 of the vehicle A from the terminal device 2 via the data center B or a method in which the user inputs an arbitrary battery level. According to the former method, the calculation can be made based on the most recent battery level when actually departing; therefore, obtaining a result that is in line with the ordinary state at the current time is possible. According to the latter method, the user can specify the battery level beforehand; therefore, obtaining a result that assumes a departure after the battery has been charged 100% is possible.

Figure 7:
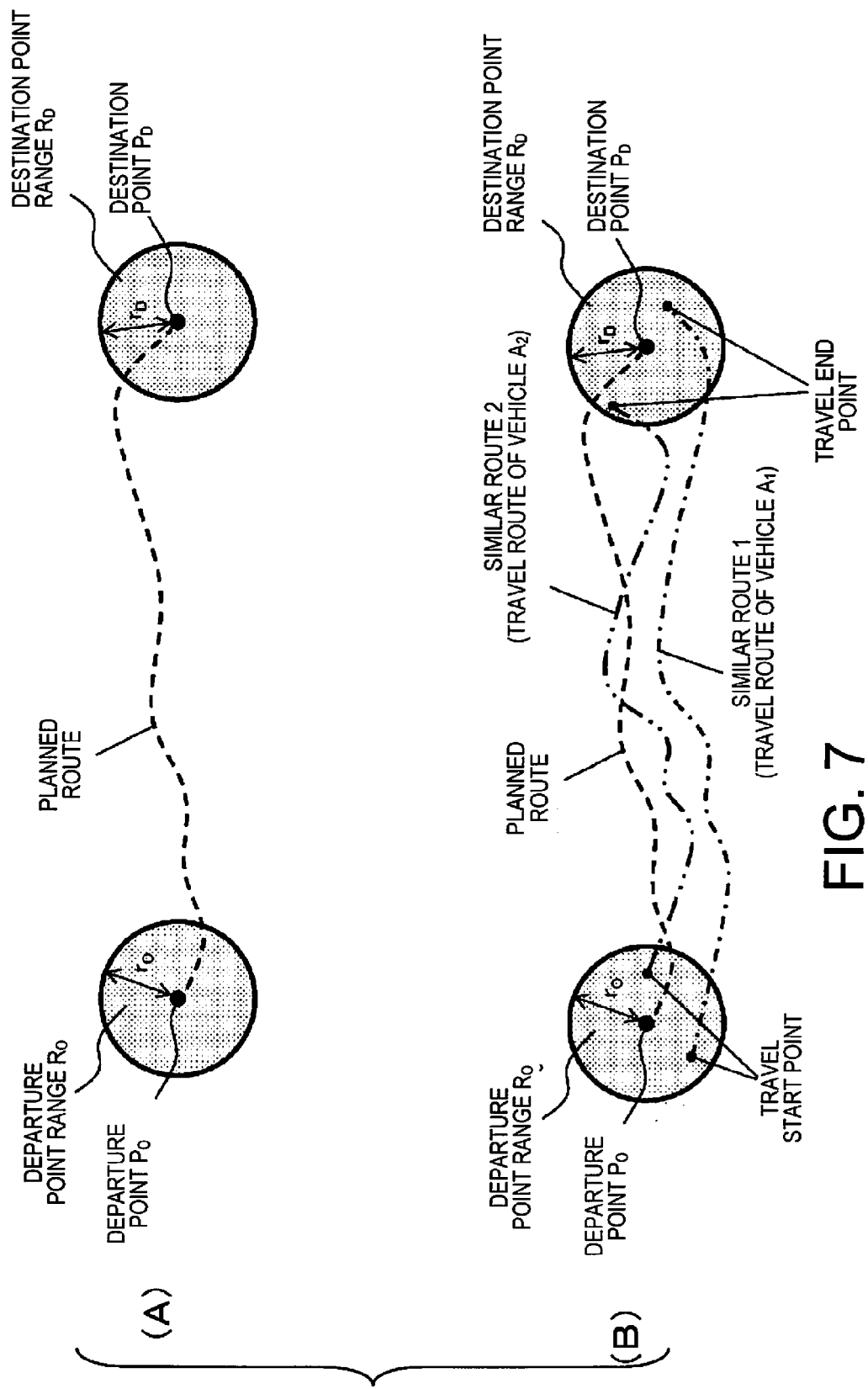
FIG. 7 is a view showing a method for searching for similar routes.

Next, the operation proceeds to step S403, and in step S403, the historical statistics processing unit 27 executes a search for a similar route. Specifically, the historical statistics processing unit 27 sets the departure point range $R_O$ and the destination point range $R_D$ based on the departure point $P_O$ and the destination point $P_D$ included in the received presentation route search request. FIG. 7 is a view showing a method for searching for similar routes in the present embodiment. In the present embodiment, the historical statistics processing unit 27 sets a circular range having a radius $r_O$ from the departure point $P_O$ as the departure point range $R_O$ and sets a circular range having a radius $r_D$ from the destination point as the destination point range $R_D$, as illustrated in part (A) of FIG. 7.

Next, from the first piece of driving history information (route) accumulated by the driving history accumulation unit 26, the historical statistics processing unit 27 searches for a route having a travel start point and a travel end point within the set departure point range $R_O$ and the destination point range $R_D$ and detects the searched route as a similar route. Specifically, the historical statistics processing unit 27 sets a route in which the travel start point is within the departure point range $R_O$ and the travel end point is within the destination point range $R_D$ as a similar route. For example, in the example illustrated in part (B) of FIG. 7, an example is shown in which two routes, "similar route 1" and "similar route 2," are detected in relation to the planned route that connects the departure point $P_O$ and the destination point $P_D$.

In the present embodiment, a predetermined distance (for example, 5 km) may be set as the radius $r_O$ and the radius $r_D$, which define the magnitude (size) of the departure point range $R_O$ and the destination point range $R_D$. According to the present embodiment, by setting and using a departure point range $R_O$ and a destination point range $R_D$ having a predetermined range when setting a similar route in this way, situations in which there is no corresponding similar route within the first piece of driving history information (route), which is accumulated by the driving history accumulation unit 26, can be avoided, and appropriately setting a similar route is, thereby, possible.

Then, in step S403, the similar route searched in this way is set as the presentation route. The number of presentation routes is not particularly limited and may be one or a plurality.

In step S403, the historical statistics processing unit 27 gives up extracting a similar route when a similar route does not exist in the first piece of driving history information (route) accumulated by the driving history accumulation unit 26, that is, when a route having a travel start point and a travel end point within the departure point range $R_O$ and the destination point range $R_D$ does not exist.

The operation then proceeds to step S404, and the historical statistics processing unit 27 determines whether or not a similar route has been extracted in the above-described step S403. Then, if the historical statistics processing unit 27 determines that a similar route has been extracted (step S404=Yes), the operation proceeds to step S405. On the other hand, if the historical statistics processing unit 27 determines that a similar route has not been extracted (that the extraction of a similar route has been abandon) (step S404=No), the operation proceeds to step S408.

When a determination is made that a similar route has been extracted in step S404, the operation proceeds to step S405; in step S405, the historical statistics processing unit 27 determines whether or not the similar route that was extracted in step S403 is made up of only the routes of a single vehicle by referencing the first piece of driving history information that is accumulated by the driving history accumulation unit 26. That is, in step S405, the historical statistics processing unit 27 determines whether the routes of a plurality of vehicles were extracted as similar routes in step S403 described above or, in the case that a plurality of similar routes has been extracted, whether all of the extracted similar routes are the routes from a single vehicle. The determination regarding whether or not the similar routes extracted in step S403 comprise only the routes from a single vehicle can be determined by, for example, referencing the driver ID information of each route.

Then, if the historical statistics processing unit 27 determines that all of the similar routes extracted in step S403 only comprise routes from a single vehicle (step S405=Yes), a determination is made that the extracted similar routes are confidential routes, and, decides that the similar routes that are set as the presentation route shall not be made to be the presentation route, and proceeds to step S408. In this case, while a similar route is extracted in step S403, subsequently, this route will be treated as if a similar route has not been extracted. On the other hand, when the historical statistics processing unit 27 determines that a plurality of similar routes extracted in step S403 exist and that these similar routes comprise routes from a plurality of vehicles (step S405=No), the operation proceeds to step S406.

The present embodiment is configured so that, if all of the similar routes extracted in step S403 only comprise routes from a single vehicle, the route is determined to be propietary, and the determination is that the similar routes that are set as the presentation route shall not be made to be the presentation route; however, another example can also be employed. That is, for example, the configuration can be such that, even if the similar routes extracted in step S403 comprise the routes from a plurality of vehicles, when the number of extracted similar routes is equal to or less than a predetermined number set in advance, a determination is made that the similar routes that are set as the presentation route shall not be made to be the presentation route. The predetermined number in this case may be set to, for example, a number at which the route can be determined to be propietary.

If a determination is made in step S406 that a plurality of similar routes exist and that these similar routes comprise the routes from a plurality of vehicles, the operation proceeds to step S406; in step S406, the historical statistics processing unit 27 extracts the charging hubs that were traversed when driving the similar routes extracted in the above-described step S403, based on the second piece of driving history information (charging hubs) accumulated by the driving history accumulation unit 26. For example, the historical statistics processing unit 27 searches for the first piece of driving history information that includes the similar routes extracted in the above-described step S403 within the first piece of driving history information that is accumulated by the driving history accumulation unit 26. Next, the historical statistics processing unit 27 extracts the charging hubs from the second piece of driving history information that is associated with the searched first piece of driving history information within the second piece of driving history information (charging hubs) that is accumulated by the driving history accumulation unit 26.

The operation then proceeds to step S407, and the historical statistics processing unit 27 extracts the power that is consumed when driving the similar routes extracted in the above-described step S403 within the first piece of driving history information (power consumption information) that is accumulated by the driving history accumulation unit 26, after which the operation proceeds to step S413. For example, the historical statistics processing unit 27 extracts the power consumption from the first piece of driving history information, which includes the similar routes extracted in the above-described step S403.

In this manner, in the present embodiment, the historical statistics processing unit 27 extracts similar routes from the first piece of driving history information that is accumulated by the driving history accumulation unit 26. Then, the historical statistics processing unit 27 extracts information regarding the charging hubs that were traversed when driving the similar routes from the second piece of driving history information that is accumulated by the driving history accumulation unit 26. Next, the historical statistics processing unit 27 extracts the power that was consumed when driving the extracted similar routes from the first piece of driving history information that is accumulated by the driving history accumulation unit 26. Therefore, acquiring a more appropriate information regarding the power consumption and charging hubs is possible. Accordingly, providing the power consumption information and the charging hub information that are more in accordance with the actual environment is possible.

On the other hand, when a determination is made that a similar route has not been extracted in step S404 described above, or when a determination is made in step S405 described above that all of the similar routes extracted in step S403 comprise routes from a single vehicle, the operation proceeds to step S408; in step S408, the historical statistics processing unit 27 searches for (decides) a similar composite route, which is a composite route that is identical or similar to the planned route, by referencing a composite route that is generated by combining the plurality of routes accumulated by the driving history accumulation unit 26.

Figure 8:
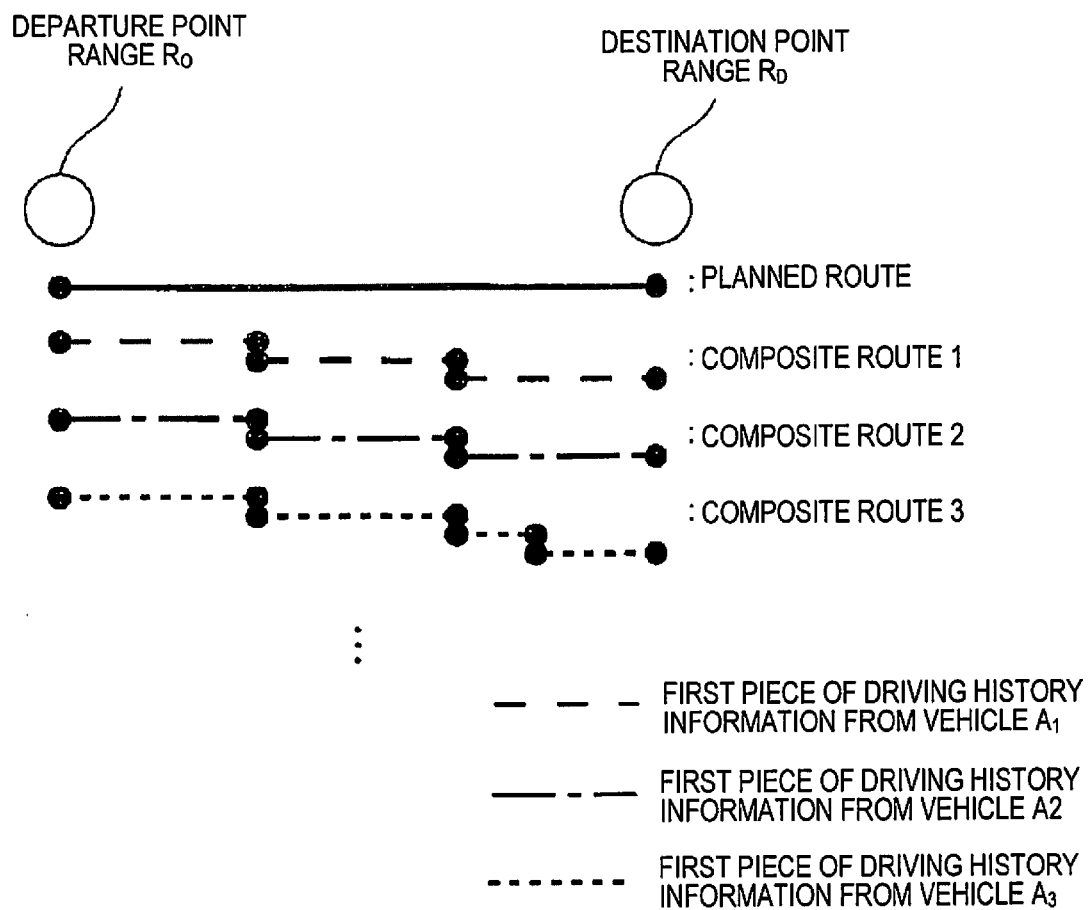
FIG. 8 is an explanatory view representing a composite route.

Here, FIG. 8 is an explanatory view representing a composite route. As illustrated in FIG. 8, the historical statistics processing unit 27 extracts information regarding a composite route that is obtained by combining a plurality of routes that were traveled by the same vehicle and extracts a composite route in which the travel start point is within the departure point range $R_O$ and the travel end point is within the destination point range $R_D$, which are set in step S403 described above, as a similar composite route.

Figure 9:
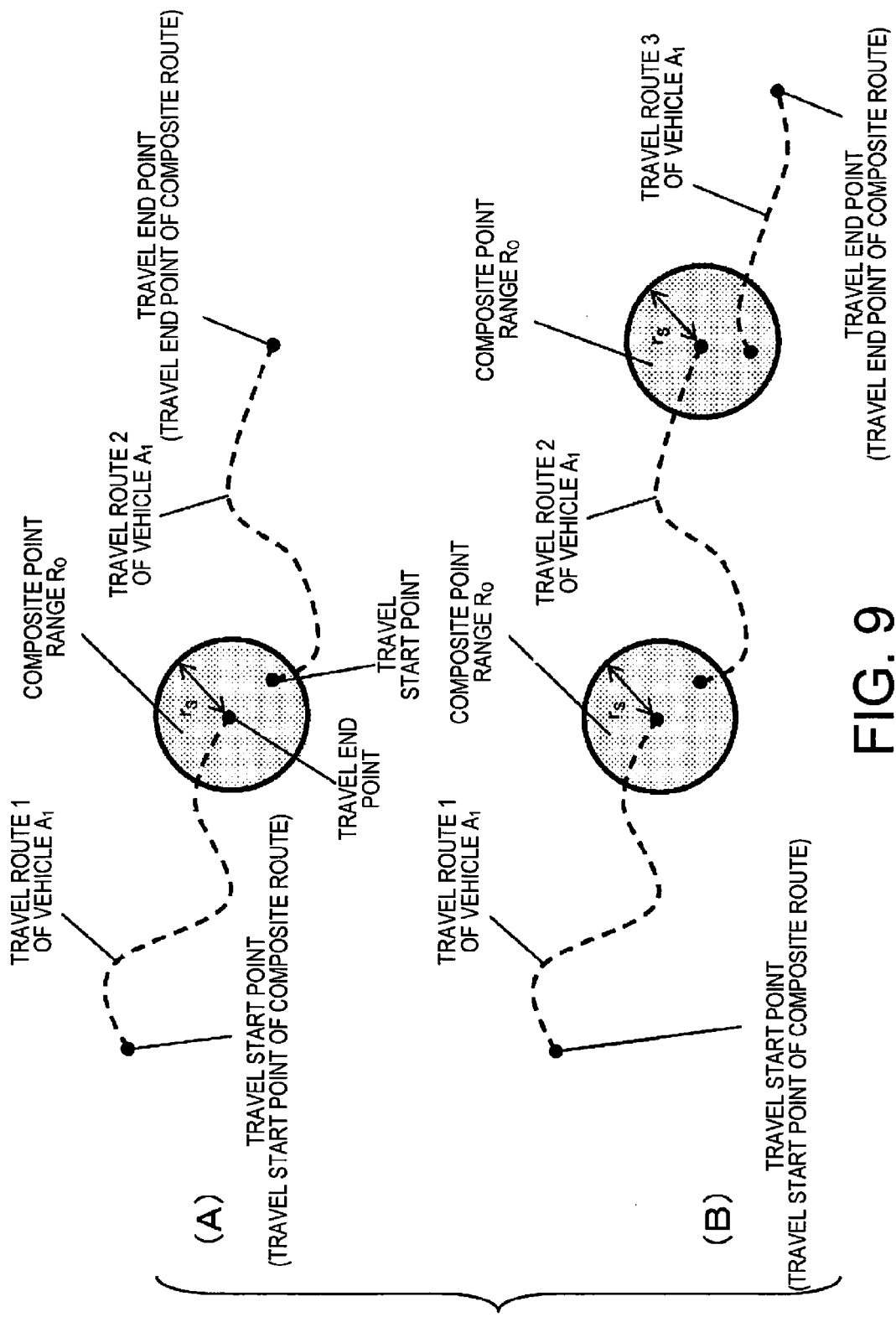
FIG. 9 is a view showing one example of a method for generating a composite route.

Meanwhile, this type of composite route is generated by the driving history accumulation unit 26 with the following method. Here, FIG. 9 is a view showing one example of a method for generating a composite route, and the method for generating the composite route will be described below, with reference to the example illustrated in FIG. 9. That is, first, the driving history accumulation unit 26 extracts an arbitrary route from among the routes that were traveled by a specific vehicle $A_1$ by referencing the accumulated first piece of driving history information. For example, the arbitrary route in the example illustrated in part (A) of FIG. 9 is "route 1 of vehicle $A_1$." The driving history accumulation unit 26 then sets a circular range having a radius $r_S$ from the travel end point of the extracted "route 1 of vehicle $A_1$" as a composite point range $R_S$ and searches for a route having a travel start point within the composite point range $R_S$ from among the routes that were traveled by the vehicle $A_1$. As a result, if a route having a travel start point within the composite point range $R_S$ is searched for, the driving history accumulation unit 28 combines these routes, thereby generating a composite route, and accumulates the generated composite route. That is, in the example illustrated in part (A) of FIG. 9, the "route 1 of vehicle $A_1$" and the "route 2 of vehicle $A_1$" having a travel start point within the composite point range $R_S$ are combined, thereby generating a composite route made of "route 1 of vehicle $A$," and "route 2 of vehicle $A_1$," which is then accumulated. The radius $r_S$ is not particularly limited and may be, for example, around 1-5 km.

In this case, the travel start point and the travel end point of the composite route will be each of the end points of the composite route (the points excluding those points used for combining). That is, in the composite route comprising "route 1 of vehicle $A_1$" and "route 2 of vehicle $A_1$" illustrated in part (A) of FIG. 9, the travel start point of "route 1 of vehicle $A_1$" becomes the travel start point of the composite route, and the travel end point of "route 2 of vehicle $A_1$" becomes the travel end point of the composite route.

In the example illustrated in part (A) of FIG. 9, an example was shown in which two routes are combined, but the number of combined routes when obtaining a composite route is not limited to two and may be three or greater. That is, for example, as in the example illustrated in part (B) of FIG. 9, generating a composite route comprising a "route 1 of vehicle $A_1$," a "route 2 of vehicle $A_1$," and a "route 3 of vehicle $A_1$," is possible by further combining a "route 3 of vehicle $A_1$" that has a travel start point within the composite point range $R_S$, which is a circular range having a radius $r_S$ from the travel end point of the "route 2 of vehicle $A_1$," with a composite route comprising "route 1 of vehicle $A_1$" and "route 2 of vehicle $A_1$." In a composite route obtained in this manner, the travel start point of "route 1 of vehicle $A_1$" becomes the travel start point of the composite route, and the travel end point of "route 3 of vehicle $A_1$" becomes the travel end point of the composite route.

In the description above, an example was explained in which a composite route is generated regarding a specific vehicle $A_1$; however, as illustrated in FIG. 8, the driving history accumulation unit 26 generates a composite route for each vehicle by combining the plurality of routes that were traveled by each of vehicle $A_2$, vehicle $A_3$, . . . besides vehicle $A_1$; and the driving history accumulation unit 26 accumulates a plurality of composite routes combined for each vehicle by storing the composite routes generated in this way.

In the example described above, an example was explained in which a circular range having a radius $r_S$ from the travel end point of an arbitrary route is set as the composite point range $R_S$, and a route having a travel start point within the composite point range $R_S$ is combined; however, a rectangular range configured from a $\pm d_1$ latitude and a $\pm d_2$ longitude about the travel end point may be set as the composite point range $R_S$; or, a mesh that is made by delimiting the latitude and longitude on a map per a predetermined step can be set, and a predetermined number of mesh ranges around the travel end point may also be set as the departure point range $R_O$ and the destination point range $R_D$.

Figure 10:
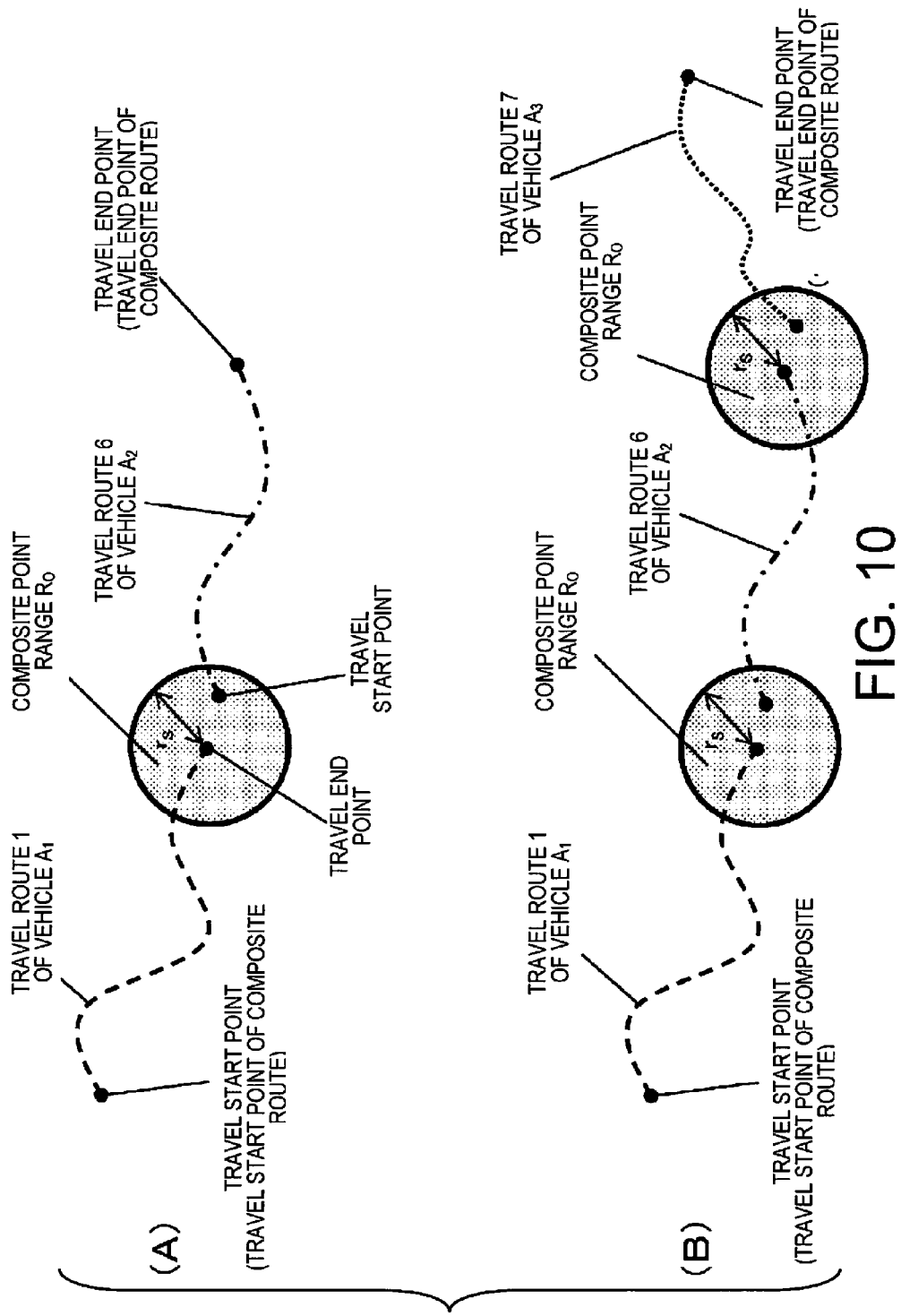
FIG. 10 is a view showing another example of a method for generating a composite route.

Additionally, in the example described above, an example was explained in which a composite route is generated based on a plurality of routes that were traveled by the same vehicle; however, the configuration can be such that a composite route is generated by, for example, combining a plurality of routes traveled by a plurality of different vehicles. That is, in the present embodiment, upon generating a composite route, when there is a travel start point of a "route 6 of vehicle $A_2$," which is a route of another vehicle $A_2$, within a composite point range $R_S$, which is a circular range having a radius $r_S$ from the travel end point of "route 1 of vehicle $A_1$," the driving history accumulation unit 26 combines the above and generates a composite route of "route 1 of vehicle $A_1$" and "route 6 of vehicle $A_2$," as illustrated in part (A) of FIG. 10. In this type of case as well, as illustrated in part (B) of FIG. 10, the driving history accumulation unit 26 may combine a "route 7 of vehicle $A_3$," which is a route of yet another vehicle $A_3$, and generate a composite route that is made by combining the routes of three vehicles $A_1$, $A_2$, and $A_3$.

Then, in step S408, the historical statistics processing unit 27 extracts a composite route, in which the travel start point is within the departure point range $R_O$ and the travel end point is within the destination point range $R_D$, which are set in step S403 described above, within the composite routes that are combined and accumulated by the driving history accumulation unit 26 in this way, as a similar composite route, and determines the extracted similar composite route to be the presentation route.

In step S408, the historical statistics processing unit 27 gives up extracting a similar composite route when a composite route that has a travel start point and a travel end point within the departure point range $R_O$ and the destination point range $R_D$ does not exist among the composite routes accumulated in the history accumulation unit 26.

The operation then proceeds to step S409, and the historical statistics processing unit 27 determines whether or not a similar composite route has been extracted in the above-described step S407. Then, if the historical statistics processing unit 27 determines that a similar composite route has been extracted (step S409=Yes), the operation proceeds to step S410. On the other hand, if the historical statistics processing unit 27 determines that a similar composite route has not been extracted (the extraction of a composite route was given up) (step S409=No), the operation proceeds to step S413.

When a determination is made that a similar composite route has been extracted in step S409, the operation proceeds to step S410; in step S410, the historical statistics processing unit 27 determines whether or not the similar composite route that was extracted in step S408 is comprised only the routes from a single vehicle by referencing the first piece of driving history information that is accumulated by the driving history accumulation unit 26. That is, in step S410, the historical statistics processing unit 27 determines whether a similar composite route comprised of the routes from a plurality of vehicles were extracted in step S408 described above or, in the case that a plurality of similar composite routes are extracted, whether all the plurality of extracted similar composite routes are the routes from a single vehicle. The determination regarding whether or not the similar composite routes extracted in step S403 are only the routes from a single vehicle can be determined by, for example, referencing the driver ID information from each of the routes that configures each of the similar composite routes.

Then, if the historical statistics processing unit 27 determines that all of the similar composite routes extracted in step S408 are only comprised of the routes from a single vehicle (step S410=Yes), a determination is made that the extracted similar composite routes are confidential routes, and, decides that the similar routes that are set as the presentation route shall not be made to be the presentation route, and proceeds to step S413. In this case, while a similar composite route is extracted in step S408, subsequently, this will be treated as if a similar composite route has not been extracted. On the other hand, when the historical statistics processing unit 27 determines that a plurality of similar composite routes extracted in step S408 exist and that these similar composite routes are comprised of routes from a plurality of vehicles (step S410=No), the operation proceeds to step S411.

The present embodiment is configured so that, if all of the similar composite routes extracted in step S408 are comprised only of routes from a single vehicle, the route will be determined to be propietary, and a determination is made that the similar composite routes that have been set as the presentation route shall not be made to be the presentation route; however, another example can also be employed. That is, for example, the configuration can be such that, even if the similar composite routes extracted in step S408 are comprised of routes from a plurality of vehicles, when the number of extracted similar composite routes is equal to or less than a predetermined number that has been set in advance, a determination is made that the similar composite routes that have been set as the presentation route shall not be made to be the presentation route. The predetermined number in this case may be set to, for example, a number at which the route can be determined to be propietary.

If a determination is made in step S410 that a plurality of similar composite routes exist and that these similar composite routes are comprised of routes from a plurality of vehicles, the operation proceeds to step S411; in step S411, the historical statistics processing unit 27 extracts the charging hubs that were traversed when driving the routes that form the similar composite routes extracted in the above-described step S408 from the second piece of driving history information (charging hubs) accumulated by the driving history accumulation unit 26. For example, the historical statistics processing unit 27 searches the first piece of driving history information that includes the traveling routes that form the similar composite routes extracted in the above-described step S408 within the first piece of driving history information that is accumulated by the driving history accumulation unit 26. Next, the historical statistics processing unit 27 extracts the charging hub information from the second piece of driving history information that is associated with the searched first piece of driving history information within the second piece of driving history information (charging hub information) that is accumulated by the driving history accumulation unit 26. The historical statistics processing unit 27 then makes each of the extracted charging hubs the charging hubs that were traversed when driving the similar composite routes extracted in the above-described step S408.

The operation then proceeds to step S412, and the historical statistics processing unit 27 extracts the power that is consumed when driving the routes that form the similar composite routes extracted in the above-described step S408 within the first piece of driving history information (the power consumption information) that is accumulated by the driving history accumulation unit 26. For example, the historical statistics processing unit 27 extracts the power consumption information from the first piece of driving history information, which includes the routes that form the similar composite routes extracted in the above-described step S408. The historical statistics processing unit 27 then makes the sum of the extracted power consumption the power that was consumed when driving the similar composite routes extracted in the above-described step S408.

In this way, in the present embodiment, the historical statistics processing unit 27 extracts a composite route, in which the travel start point is within the departure point range $R_O$ and the travel end point is within the destination point range $R_D$, from the composite routes that are accumulated by the driving history accumulation unit 26, as a similar composite route. Then, the historical statistics processing unit 27 extracts the charging hubs that were traversed when driving the routes that form the similar composite routes from the second piece of driving history information that is accumulated by the driving history accumulation unit 26. The historical statistics processing unit 27 then extracts the power that was consumed when driving the routes that form the similar composite routes from the first piece of driving history information that is accumulated by the driving history accumulation unit 26. Accordingly, appropriately acquiring the power consumption and charging hub information is possible even when a similar route (that is, a route that is identical or similar to the planned route) does not exist within the first piece of driving history information that is accumulated by the driving history accumulation unit 26.

On the other hand, when a determination is made that a similar composite route has not been extracted in step S409, or when a determination is made in step S410 described above that all of the similar composite routes extracted in step S408 are comprised of routes from a single vehicle, the operation proceeds to step S413; in step S413, the historical statistics processing unit 27 calculates the power that is consumed when driving the planned route that was searched for in the above-described step S401, based on the theoretical performance of the host vehicle A (hereinafter also referred to as the theoretical power consumption). Specifically, the historical statistics processing unit 27 makes the result of multiplying the power consumption per a predetermined unit distance by the total length of the planned route equal the theoretical power consumption.

The operation then proceeds to step S414, and the historical statistics processing unit 27 extracts the position of the charging facility C that exists in the vicinity of the planned route that is searched for in the above-described step S401, based on the map information that is stored by the map information storage unit 25, after which the operation proceeds to step S415. The charging facility C that exists in the vicinity of the planned route may be a charging facility C that exists along the planned route or a charging facility C that is within a set distance (for example, 20 m) from the planned route, etc.

The operation then proceeds to step S415, and the historical statistics processing unit 27 determines whether or not a presented route that includes a private location $P_P$, exists within the presented routes (the similar routes, the similar composite routes) that are extracted in step S403 or S408 described above. The method for detecting a private location $P_P$ is described below. Then, if the historical statistics processing unit 27 determines that a presented route that includes a private location $P_P$ exists within the presented routes (the similar routes, the similar composite routes) (step S415=Yes), the operation proceeds to step S416. On the other hand, if the historical statistics processing unit 27 determines that a presented route that includes a private location $P_P$ does not exist within the presented routes (the similar routes, the similar composite routes) (step S416=Yes), the operation proceeds to step S417.

If a determination is made in step S415 that a presented route that includes a private location $P_P$ exists within the presented routes (the similar routes, the similar composite routes), the operation proceeds to step S416; in step S416, regarding the presented route that includes a private location $P_P$, an operation that makes specifying the private location $P_P$ (the private location protection operation) impossible is executed when displaying the presented route in the display unit 24. The details of the operation that makes specifying the private location $P_P$ impossible will be described below.

Next, in step S417, the historical statistics processing unit 27 executes a charging hub extraction operation based on the battery level acquired in the above-described step S402. In the charging hub extraction operation, the historical statistics processing unit 27 extracts the charging hubs that are transmitted (provided) to the source terminal device 2 from the charging hubs acquired in steps S406, S411, or S414 described above. An example of a source terminal device 2 may be, for example, the terminal device 2 of the transmission source of the presentation route search request, which acted as a trigger to start this historical statistics processing step. Additionally, in the charging hub extraction operation, the possibility that the vehicle A cannot reach the destination point is determined; when a determination is made that there is a possibility that the vehicle cannot reach the destination, an unreachable warning, which provides a warning to that effect, will be issued. The details of the charging hub extraction operation will be described below.

The operation then proceeds to step S418, and the historical statistics processing unit 27 executes a power consumption correction operation, based on the power consumption trend of the driver of the vehicle A. In the power consumption correction operation, the historical statistics processing unit 27 calculates the power that is consumed when driving the presented route (the similar route, the similar composite route) by referencing the first piece of driving history information from the driver that is specified by the driver ID, which is included in the presentation route search request, from the first piece of driving history information that is accumulated by the driving history accumulation unit 26. The historical statistics processing unit 27 then corrects the power consumption extracted in steps S407, S412, or S413 described above, based on the calculated power consumption. The details of the power consumption correction operation will be described below.

The operation then proceeds to step S419, and the historical statistics processing unit 27 transmits (provides) to the source terminal device 2 the presented route (the similar route, the similar composite route) extracted in step S403 or S408 described above; the charging hubs extracted in step S417 described above; and information regarding power consumption that was corrected in step S418 described above, after which the driving historical statistics processing step ends. If a presented route could not be extracted in step S403 and step S408 described above, the historical statistics processing unit 27 transmits information regarding the planned route searched for in the above-described step S401, the charging hubs extracted in the above-described step S417, and the power consumption (the theoretical power consumption) calculated in the above-described step S414. If a determination to issue an unreachable warning is made in the above-described step S417, the historical statistics processing unit 27 also transmits (provides) a control command for displaying the unreachable warning to the source terminal device 2.

In the present embodiment, an example was explained in which information regarding the charging hubs extracted in the above-described step S417 and the power consumption that is corrected in the above-described step S418 is transmitted (provided) to the source terminal device 2; however, another configuration may also be employed. For example, the configuration may such that information regarding the charging hubs acquired in steps S406, S411, or S414 described above and the power consumption before correction in the above-described step S418 are transmitted (provided) to the source terminal device 2.

Private Location Detection Operation

Figure 11:
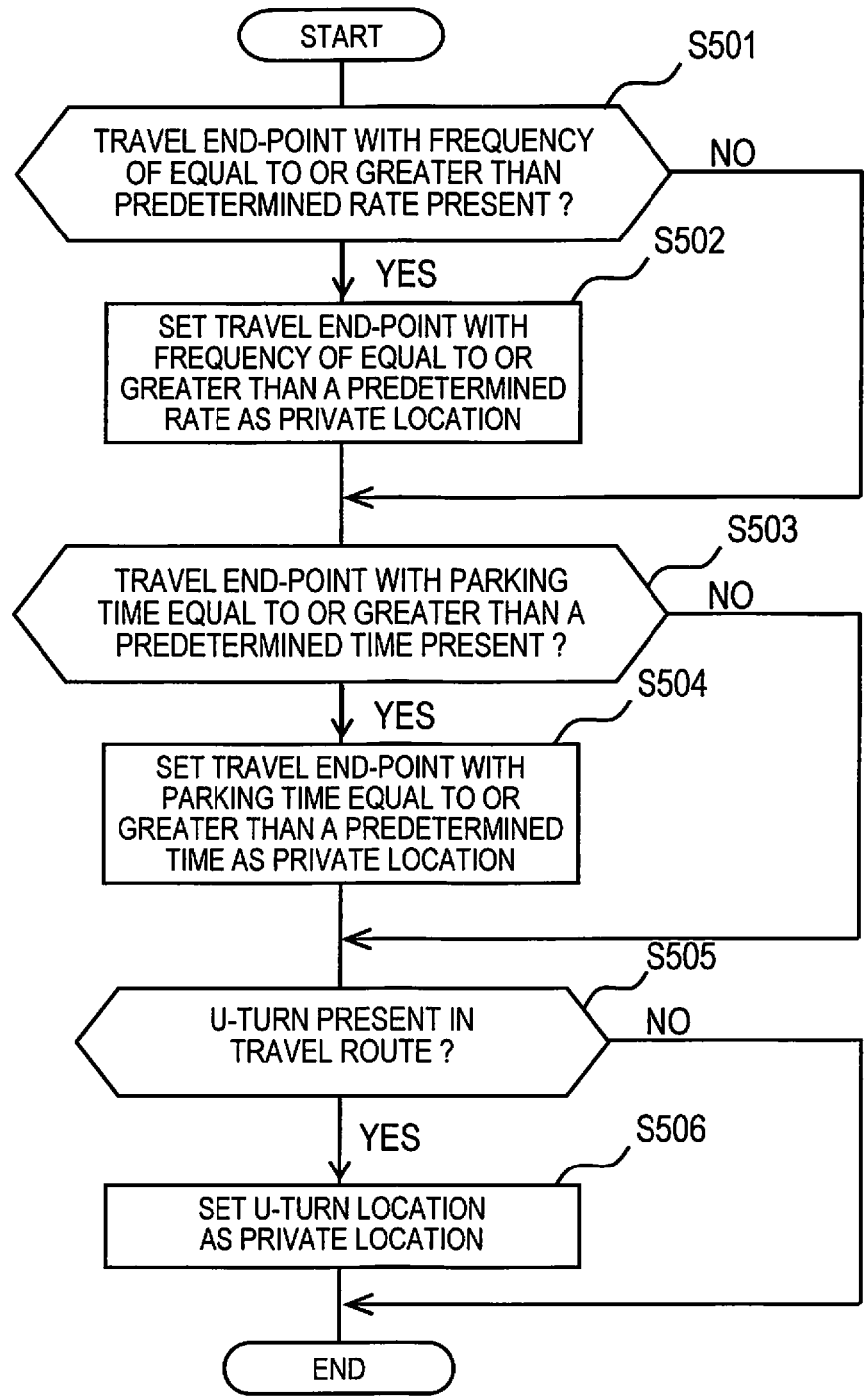
FIG. 11 is a flowchart representing the private location detection operation.

Next, the private location detection operation that is executed by the driving history accumulation unit 26 will be described. The driving history accumulation unit 26 executes the private location detection operation using the accumulated first piece of driving history information and second piece of driving history information received from the route calculation unit 23. FIG. 11 is a flowchart representing the private location detection operation.

First, in step S501, the driving history accumulation unit 26 extracts the driving history of the same driver (the driving history of a driver with an identical driver ID) by referencing the accumulated first piece of driving history information and the second piece of driving history information; based on the information regarding the travel start point and the travel end point included in the extracted driving history (hereinafter, the travel start point and the travel end point are referred to as the "travel end-points" when appropriate), the frequency of travel end-points per each location are calculated, as illustrated in FIG. 11. As a result of calculating the frequency of the travel end-points, the driving history accumulation unit 26 determines whether or not a location exists at which the frequency is equal to or greater than a predetermined rate. When the driving history accumulation unit 26 determines that a travel end-point at which the frequency is equal to or greater than a predetermined rate as a result of the determination exists (step S501=Yes), the operation proceeds to step S502. On the other hand, when the driving history accumulation unit 26 determines that a travel end-point at which the frequency is equal to or greater than a predetermined rate does not exist (step S501=No), the operation proceeds to step S503. The predetermined rate in this case may be, for example, set to a rate at which a travel end-point can be determined to be a location that is private, such as the location of one's home or the location of an acquaintance's home.

When a determination is made that a travel end-point at which the frequency is equal to or greater than a predetermined rate in step S501 exists, the operation proceeds to step S502; in step S502, the driving history accumulation unit 26 sets the travel end-point that was determined to have a frequency of equal to or greater than a predetermined rate in step S501 to a private location $P_P$ and accumulates the set private location $P_P$.

The operation then proceeds to step S503, and the driving history accumulation unit 26 extracts the driving history of the same driver (the driving history of a driver with an identical driver ID) by referencing the accumulated first piece of driving history information and the second piece of driving history information and calculates the parking time from the extracted driving history. The parking time can be obtained by extracting travel histories that are temporally continuous and calculating the differences between the date and time of the travel end time and the date and time of the travel start time of these travel histories. The driving history accumulation unit 26 then determines whether or not a travel end-point at which the parking time is equal to or greater than a predetermined time exists, regarding the travel end-points included in the driving history of the same driver. When the driving history accumulation unit 26 determines that a travel end-point at which the parking time is equal to or greater than a predetermined time exists as a result (step S503=Yes), the operation proceeds to step S504. On the other hand, when the driving history accumulation unit 26 determines that a travel end-point t which the parking time is equal to or greater than a predetermined time does not exist (step S503=No), the operation proceeds to step S505. The predetermined time in this case may be, for example, set to a time (such as 12 hours) at which a travel end-point can be determined to be a located at a private point, such as the location of one's home or the location of an acquaintance's home.

When a determination is made that a travel end-point at which the parking time is equal to or greater than a predetermined time exists in step S503, the operation proceeds to step S504; in step S504, the driving history accumulation unit 26 sets the travel end-point that was determined to have a parking time of equal to or greater than a predetermined time in step S503 to a private location $P_P$ and accumulates the set private location $P_P$.

The operation then proceeds to step S505, and the driving history accumulation unit 26 determines whether or not a U-turn portion is included in the driving history of each vehicle A by referencing the accumulated first piece of driving history information and the second piece of driving history information. An example of a method for detecting a U-turn portion may be, for example, in a route included in the driving history of each vehicle A; when an inbound lane and an outbound lane of a road link were traveled within a set distance, this type of portion is detected as a U-turn portion. Alternatively, other methods for detecting a U-turn portion may be a method for detecting whether or not a closed loop of equal to or less than a predetermined area is formed by the route or a method for detecting whether or not both a positive direction vector and a negative direction vector are included in the route within a predetermined distance range. Then, when the driving history accumulation unit 26 determines that a U-turn portion exists (step S505=Yes), the operation proceeds to step S506. On the other hand, when the driving history accumulation unit 26 determines that a U-turn portion is not included (step S505=No), the privacy point detection operation ends.

When a determination is made that a U-turn portion exists in step S505, the operation proceeds to step S506; in step S506, the driving history accumulation unit 26 sets the region that is determined to have a U-turn portion in step S505 to a private location $P_P$ and accumulates the set private location $P_P$. However, in this case, if there is a public charging facility in the U-turn portion and charging was performed there, a determination is made that this is not a location that is private; therefore, this location is excluded from the private location $P_P$. In the present embodiment, conceivably, this type of U-turn portion could be generated when picking up or dropping off an acquaintance at the acquaintance's home or by going off of a desired route and coming back again; as a result, a determination is made that this location is private when this type of U-turn portion is detected, and this is then set to be a private location $P_P$.

As described above, the driving history accumulation unit 26 detects locations that can be determined to be private locations, based on the accumulated first piece of driving history information and the second piece of driving history information, and accumulates the detected locations as private locations $P_P$.

When the historical statistics processing unit 27 determines in step S415 described above whether or not a private location $P_P$ set in this way is included in the presented routes (the similar routes, the similar composite routes), which are extracted in steps S404 or S408 described above, and if a private location $P_P$ is included, regarding the presented route that includes the private location $P_P$ in the above-described step S416, the historical statistics processing unit 27 executes an operation that makes specifying the private location $P_P$ impossible (the private location protection operation) when displaying the presented route in the display unit 24. The private location protection operation that is executed by the historical statistics processing unit 27 will be described in detail below.

Figure 12:
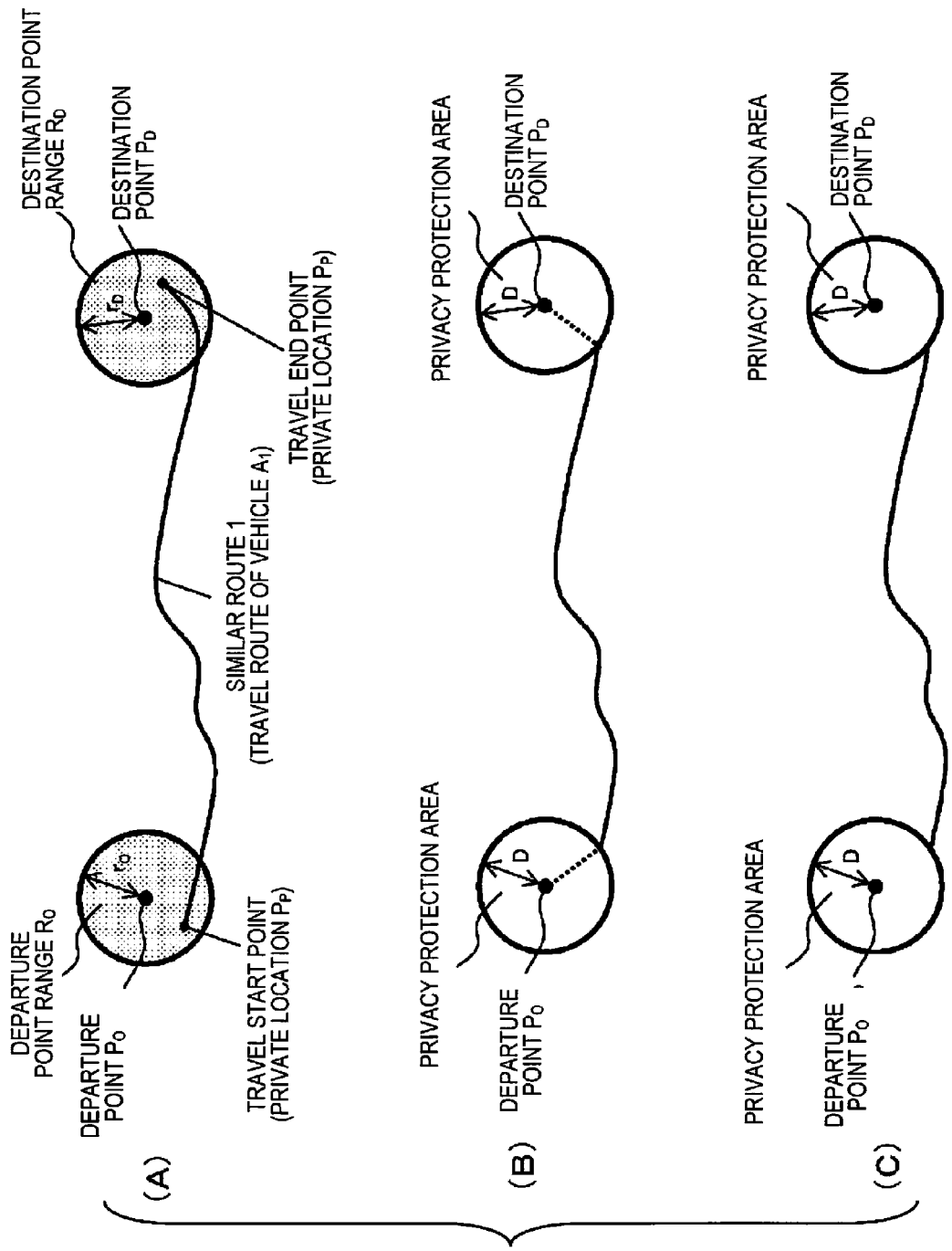
FIG. 12 is a view showing a method for the private location protection operation.

Here, FIG. 12 is a view showing a method for the private location protection operation. In FIG. 12, a case is shown in which both the travel start point and the travel end point of the presented route (the similar route) are private locations (the travel end-points at which the frequency is equal to or greater than a predetermined rate, the travel end-points at which the parking time is equal to or greater than a predetermined time), as illustrated in part (A) of FIG. 12. The historical statistics processing unit 27 then sets within a predetermined distance D range from the departure point $P_O$ and the destination point $P_D$ to be privacy protection areas so that this type of private location $P_P$, as well as the routes in the vicinity of the private locations $P_P$ cannot be specified, as illustrated in part (B) of FIG. 12, and an operation is conducted so that specifying the presented route (the similar route) within this type of privacy protection area is not possible. That is, by taking the form of connecting points that are in contact with the privacy protection areas at the departure point $P_O$ and destination point $P_D$ with dotted lines, as illustrated in part (B) of FIG. 12, an operation is conducted so that specifying the presentation route (the similar route) within privacy protection areas is not possible. That is, as illustrated in FIG. 2, when displaying the presentation route (the similar route) on the display unit 24, the historical statistics processing unit 27 will use dotted lines for the display within the privacy protection area. The distance D that defines the privacy protection area is not particularly limited and may be a distance at which specifying the private location $P_P$ is not possible, for example, the distance may be the same as the radii $r_O$, $r_D$, which define the departure point range $R_O$ and the destination point range $R_D$.

Figure 14:
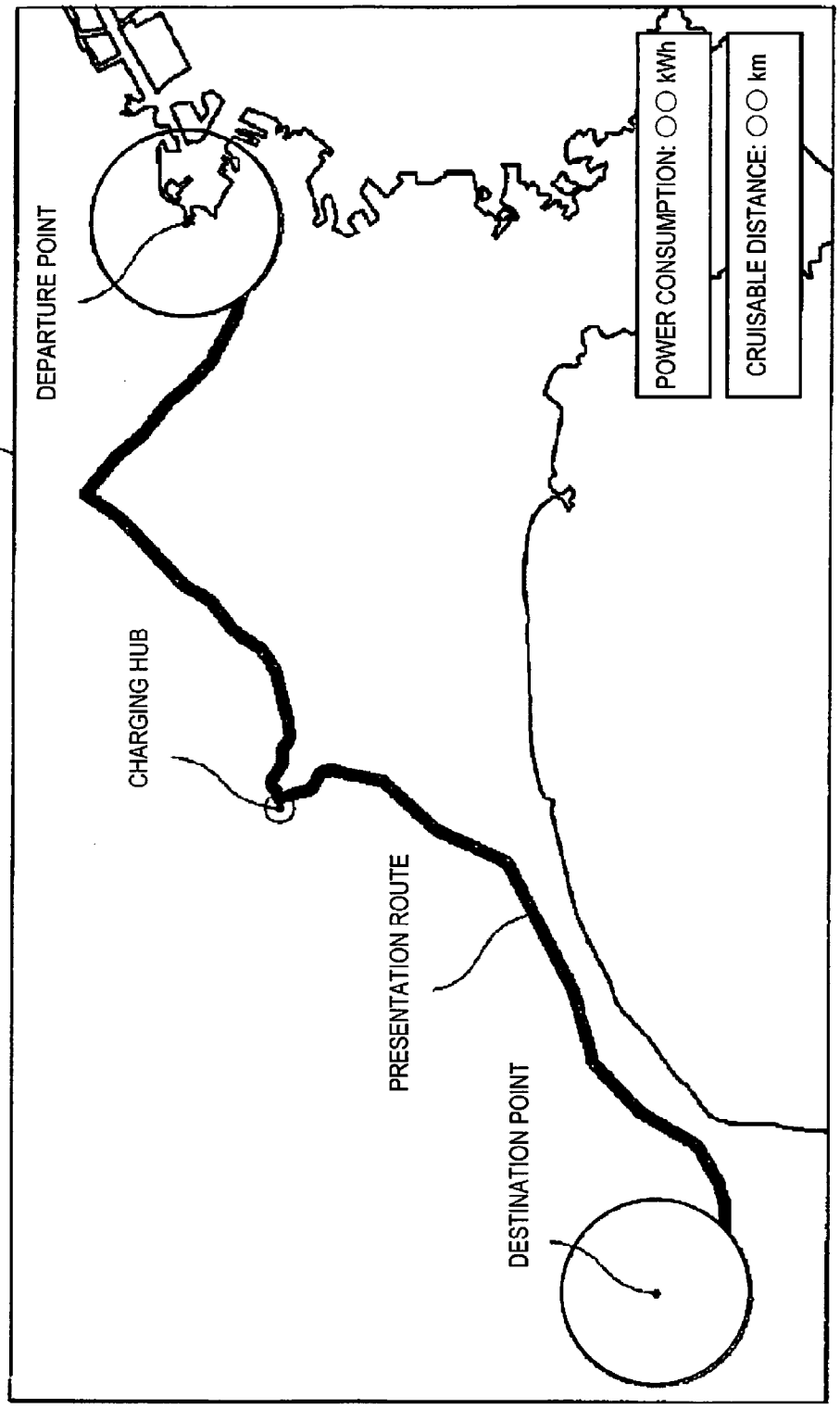
FIG. 14 is a view illustrating one example of content displayed by the display unit when conducting the private location protection operation.

Alternatively, the configuration can be such that the historical statistics processing unit 27 sets within a predetermined distance D range from the departure point $P_O$ and the destination point $P_D$ the privacy protection areas and will not display the presentation routes (the similar routes) within this type of privacy protection area, as illustrated in part (C) of FIG. 12. In this case, when displaying a presentation route (the similar route) on the display unit 24, the historical statistics processing unit 27 can be configured to not display the presentation route (the similar route) within a privacy protection area, as illustrated in FIG. 14.

Figure 15:
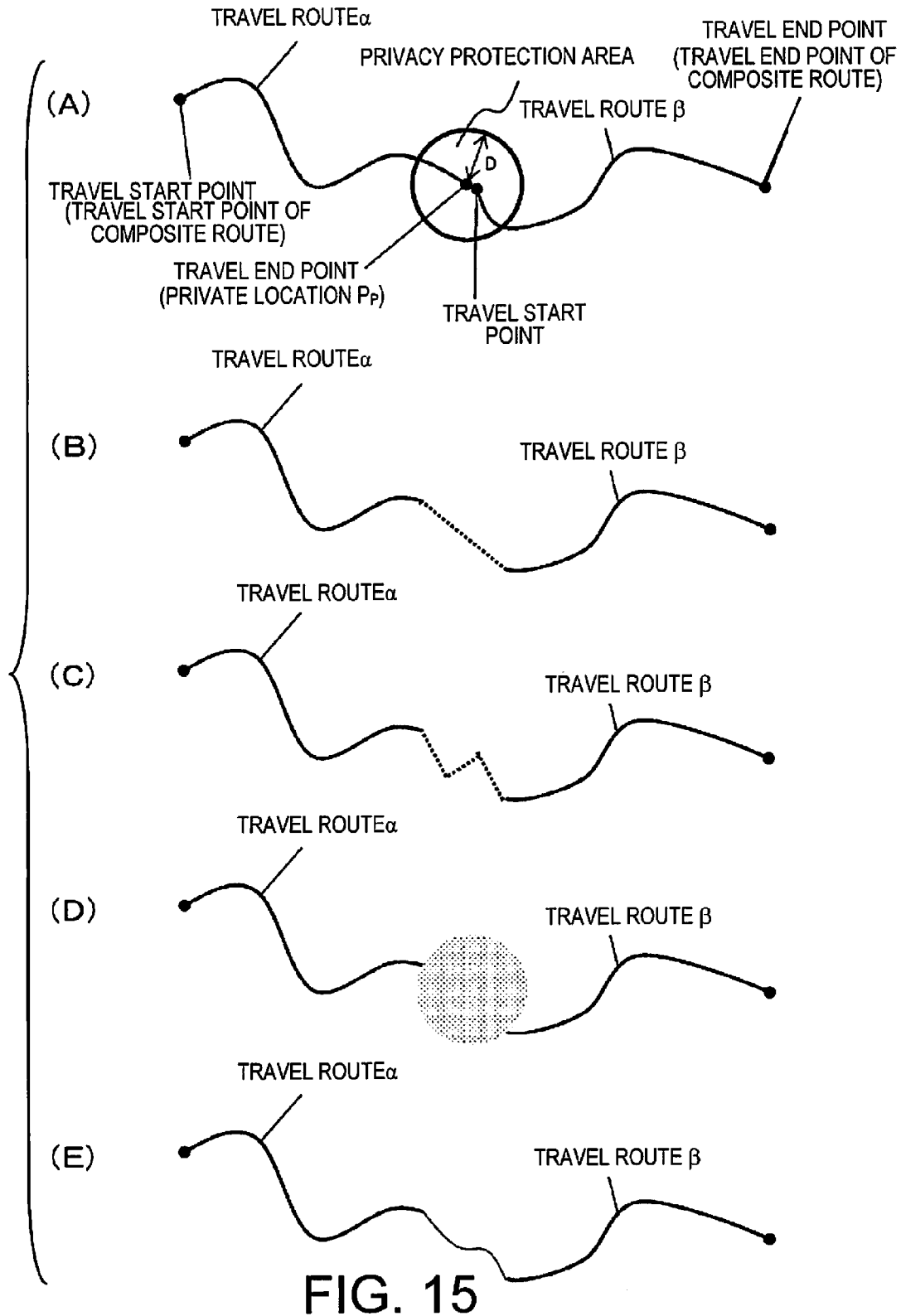
FIG. 15 is a view showing a method for the private location protection operation.

Additionally, when a private location $P_P$ exists (the travel end-points at which the frequency is equal to or greater than a predetermined rate, the travel end-points at which the parking time is equal to or greater than a predetermined time) in the similar composite route (a similar composite route comprising a route α and a route β), which is the presentation route, as illustrated in part (A) of FIG. 15, the historical statistics processing unit 27 sets within a predetermined distance D range around the private location $P_P$ a privacy protection area and conducts an operation so that specifying the presentation route (the similar route) within this type of privacy protection area is not possible, as illustrated in part (B) of FIG. 15. That is, by connecting the route α and route β, which configure the similar composite route, with a dotted line within the privacy protection area, as illustrated in part (B) of FIG. 15, an operation is conducted so that specifying the presentation route (the similar composite route) within the privacy protection area is not possible, and the presentation route (the similar route) is displayed on the display unit 24 in this manner.

Alternatively, when connecting route α and route β, which configure the similar composite route, with a dotted line within the privacy protection area, the historical statistics processing unit 27 can be configured so that the actual distance between route α and route β within the privacy protection area is reflected, as illustrated in part (C) of FIG. 15. Additionally, the historical statistics processing unit 27 may superimpose a display that covers route α and route β within the privacy protection area, as illustrated in part (D) of FIG. 15 (in the drawing, a circular shape having a predetermined area has been superimposed). Furthermore, the historical statistics processing unit 27 can be configured to search for a shortest route that connects route α and route β (the shortest route connecting a point that is in contact with the privacy protection area of the route α and the point that is contact with the privacy protection area of route β) within the privacy protection area by referencing map information that is stored in the map information storage unit 25 and displaying the shortest route obtained as a result of the search, as illustrated in part (E) of FIG. 15.

Figure 16:
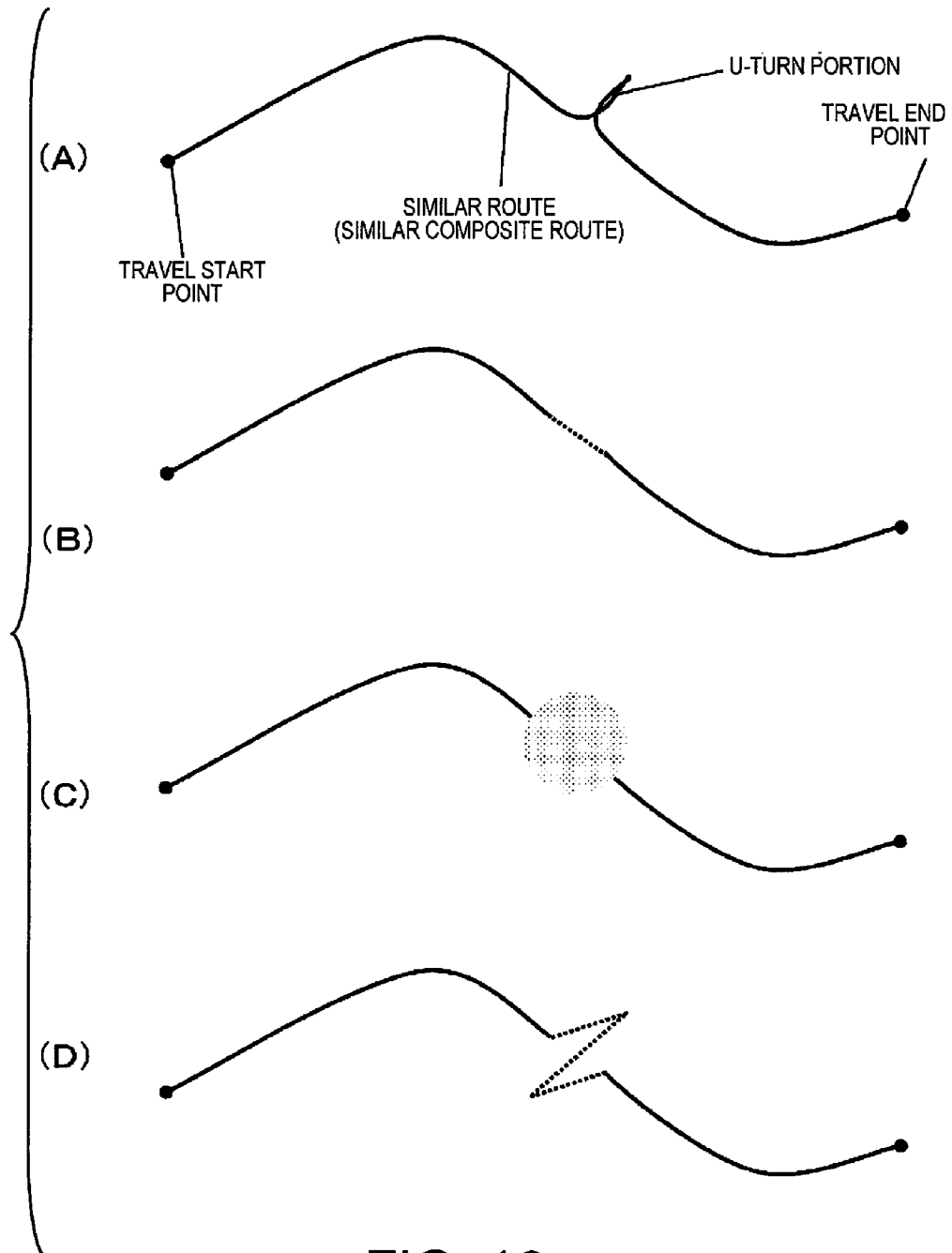
FIG. 16 is a view showing a method for the private location protection operation.

When a private location $P_P$ that is a U-turn portion exists in the presentation route (the similar route, the similar composite route), as illustrated in part (A) of FIG. 16, the historical statistics processing unit 27 conducts an operation so that the route of the U-turn portion cannot be specified by connecting the start point and the end point of the U-turn portion with a dotted line as illustrated in part (B) of FIG. 16, and the presentation route (the similar route) is displayed on the display unit 24 in this manner.

Alternatively, the historical statistics processing unit 27 can be configured so that the actual distance of the U-turn portion is reflected when the start point and the end point of the U-turn portion are connected with a dotted line, as illustrated in part (C) of FIG. 16. Additionally, the historical statistics processing unit 27 may superimpose a display that covers the start point and the end point of the U-turn portion, as illustrated in part (C) of FIG. 16 (in the drawing, a circular shape having a predetermined area has been superimposed).

Charging Hub Extraction Operation

Figure 17:
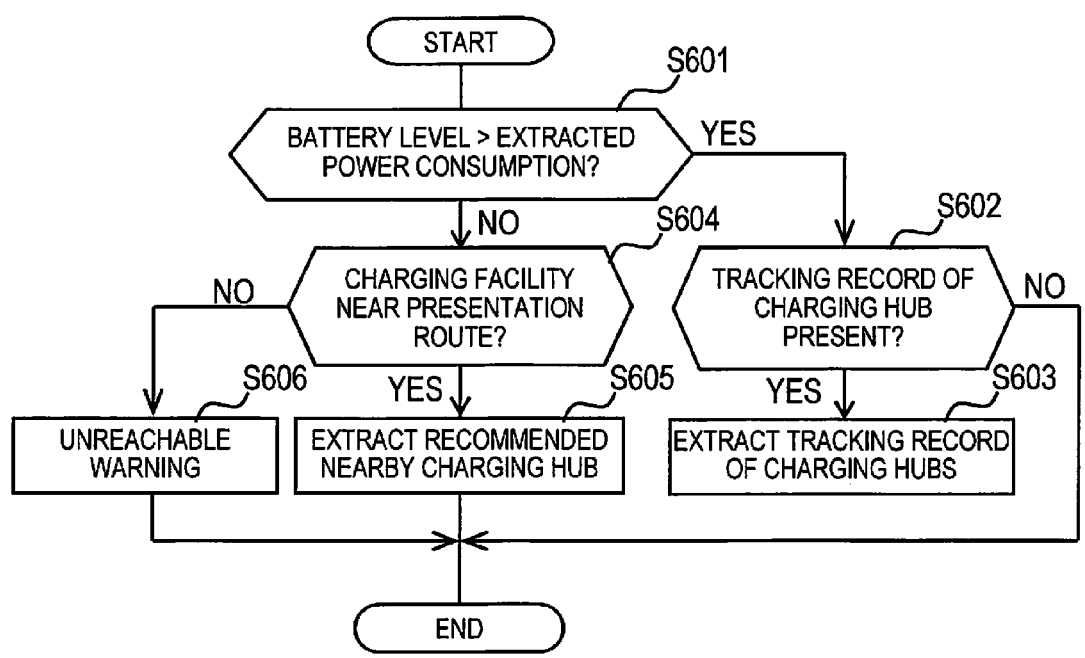
FIG. 17 is a flowchart representing the charging hub extraction operation.

Next, the charging hub extraction operation that is executed by the historical statistics processing unit 27 will be described. When the operation proceeds to step S417 in the above-described driving history statistical processing step, the historical statistics processing unit 27 executes a charging hub extraction operation. FIG. 17 is a flowchart representing the charging hub extraction operation.

First, in step S601, the historical statistics processing unit 27 determines whether or not the battery level acquired in the above-described step S402 is greater than the power consumption extracted in steps S407, S412, or S413 described above (hereinafter also referred to as the extracted power consumption), as illustrated in FIG. 17. Then, if the historical statistics processing unit 27 determines that the battery level is greater than the extracted power consumption (step S601=Yes), the operation proceeds to step S602. On the other hand, if the historical statistics processing unit 27 determines that the battery level is equal to or less than the extracted power consumption (step S601=No), the operation proceeds to step S605.

When a determination is made that the battery level is greater than the extracted power consumption in step S601, the operation proceeds to step S602; in step S602, the historical statistics processing unit 27 determines whether or not there is a tracking record of a charging hub within the charging hubs acquired in steps S407, S411, or S414 described above by referencing the second piece of driving history information (charging hubs) accumulated by the driving history accumulation unit 26. A tracking record of a charging hub may be a position of a charging facility C at which at least one of a plurality of vehicles A has actually performed charging. Then, if the historical statistics processing unit 27 determines that there is a tracking record of a charging hub (step S602=Yes), the operation proceeds to step S603. On the other hand, if the historical statistics processing unit 27 determines that there is no tracking record of a charging hub (step S602=No), a charging hub is not extracted, and the charging hub extraction operation ends. As a result, the historical statistics processing unit 27 does not transmit (provide) information on a tracking record of charging hubs to the source terminal device 2 when the battery level of the battery 14 for running the vehicle is sufficient and there is no tracking record of a charging hub among the charging hubs acquired in steps S407, S411, or S414 described above. Since, conceivably, a tracking record of a charging hub is a private-use charging facility of a particular individual or a corporation, preferentially extracting the facilities that are without a doubt public charging facilities, as determined through statistical processing, is desirable. For example, a method in which the configuration includes a separate database for public charging facilities, and those with a tracking record in the same locations as these data are extracted may be conceived, or a method for extracting the charging facilities with a charging track record in which a plurality of vehicles (for example, equal to or greater than five) owned by different entities (including corporations and individuals) have charged at the same location may be conceived. Additionally, making selections so that the charging facilities that can actually be utilized during the estimated arrival time at the hubs are preferentially traversed by considering the available time zones when utilizing these data is desirable.

On the other hand, when a determination is made that there is a tracking record of a charging hub, the operation proceeds to step S603; in step S603, the historical statistics processing unit 27 extracts the tracking record of charging hubs from the charging hubs acquired in steps S407, S411, or S414 described above by referencing the second piece of driving history information (charging hubs) accumulated by the driving history accumulation unit 26, after which the charging hub extraction operation ends. The historical statistics processing unit 27 thereby transmits (provides) to the source terminal device 2 only information regarding the tracking record of charging hubs when the battery level of the battery 14 for running the vehicle is sufficient and there are tracking record charging hubs among the charging hubs acquired in steps S407, S411, or S414 described above.

When a determination is made that the battery level is equal to or less than the extracted power consumption in the above-described step S601, the operation proceeds to step S604; in step S604, the historical statistics processing unit 27 determines whether or not a charging facility C exists in the vicinity of the presentation route (the similar route, the similar composite route) extracted in the steps S403 or S408 described above, based on the map information stored by the map information storage unit 25. The charging facility C that exists in the vicinity of the presentation route may be a charging facility C that exists along the presentation route or a charging facility C that is within a set distance (for example, 20 m) from the presentation route, etc. Then, if the historical statistics processing unit 27 determines that a charging facility C exists in the vicinity of the presentation route (the similar route, the similar composite route) (step S604=Yes), the operation proceeds to step S605. On the other hand, if the historical statistics processing unit 27 determines that a charging facility C does not exist in the vicinity of the presentation route (step S604=No), the operation proceeds to step S606.

If a presentation route could not be extracted in steps S403 or S408 described above, the historical statistics processing unit 27 determines whether or not a charging facility C exists in the vicinity of the planned route searched for in the above-described step S401, based on the map information that is stored by the map information storage unit 25. If the historical statistics processing unit 27 determines that a charging facility C exists in the vicinity of the planned route (step S604=Yes), the operation proceeds to step S605. On the other hand, if the historical statistics processing unit 27 determines that a charging facility C does not exist in the vicinity of the planned route (step S604=No), the operation proceeds to step S606.

When a determination is made that a charging facility C exists in the vicinity of the presentation route in step S604, the operation proceeds to step S605; in step S605, the historical statistics processing unit 27 extracts the position of the charging facility C that exists in the vicinity of the presentation route (the similar route, the similar composite route) (hereinafter also referred to as the recommended nearby charging hub), based on the map information that is stored by the map information storage unit 25, after which the charging hub extraction operation ends. If a presentation route could not be extracted in steps S403 or S408 described above, the historical statistical processing unit 27 extracts the recommended nearby charging hubs that are present in the vicinity of the planned route, based on the map information that is stored by the map information storage unit 25. The historical statistics processing unit 27 thereby transmits (provides) to the source terminal device 2 only information regarding the recommended nearby charging hubs when the battery level of the battery 14 for running the vehicle is insufficient and there is a recommended nearby charging hub present.

On the other hand, when a determination is made that a charging facility C does not exist in the vicinity of the presentation route in step S605, the operation proceeds to step S606; in step S606, the historical statistics processing unit 27 decides to issue an unreachable warning, after which the charging hub extraction operation ends. The historical statistics processing unit 27 thereby does not transmits (provide) to the source terminal device 2 information regarding the recommended nearby charging hubs (charging hubs) when the battery level of the battery 14 for running the vehicle is insufficient and a recommended nearby charging hub is not present.

Power Consumption Correction Operation

Figure 18:
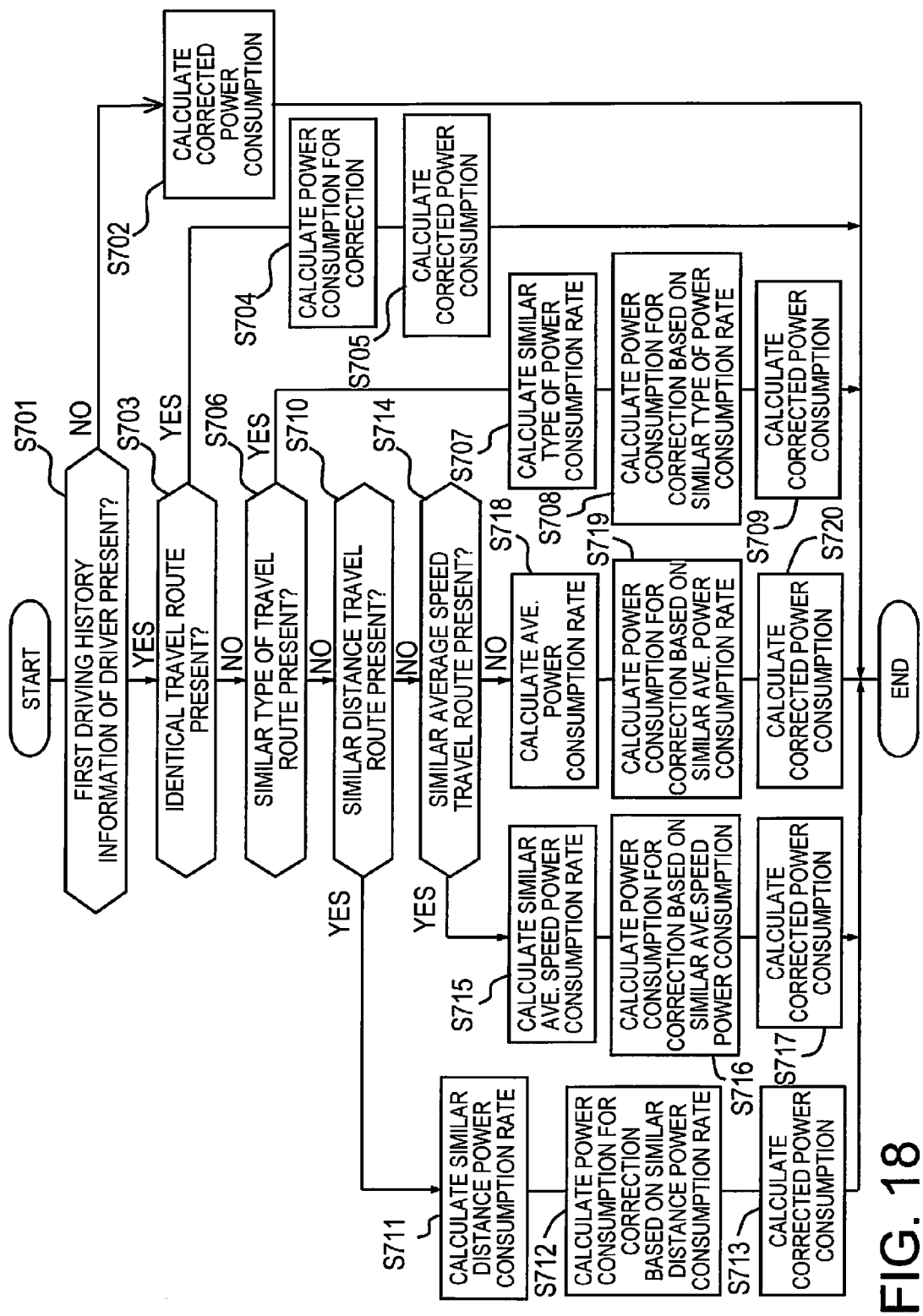
FIG. 18 is a flowchart representing the power consumption correction operation.

Next, the power consumption correction operation that is executed by the historical statistics processing unit 27 will be described. When the operation proceeds to step S418 in the above-described driving historical statistics processing step, the historical statistics processing unit 27 executes a power consumption correction operation. FIG. 18 is a flowchart representing the power consumption correction operation.

First, in step S701, the historical statistics processing unit 27 acquires the driver ID (the information identifying the driver) from the received presentation route search request, as illustrated in FIG. 18. Next, the historical statistics processing unit 27 determines whether or not there is a first piece of driving history information that includes a driver ID that is identical to the acquired driver ID (hereinafter also referred to as the source driving history information) within the first piece of driving history information that is accumulated by the driving history accumulation unit 26. Then, if the historical statistics processing unit 27 determines that there is source driving history information (step S701=Yes), the operation proceeds to step S703. On the other hand, if the historical statistics processing unit 27 determines that there is no source driving history information (step S701=No), the operation proceeds to step S702.

When a determination is made that there is source driving history information in step S701, the operation proceeds to step S702; in step S702, the historical statistics processing unit 27 sets the power consumption calculated in steps S407, S412, or S413 described above as the corrected power consumption (hereinafter also referred to as the corrected power consumption), and the power consumption correction operation ends. The historical statistics processing unit 27 thereby transmits (provides) to the source terminal device 2 information regarding the power consumption calculated in steps S407, S412, or S413 described above when source driving history information does not exist within the first piece of driving history information that is accumulated by the driving history accumulation unit 26.

On the other hand, if a determination is made that source driving history information does not exist in step S701, the operation proceeds to step S703; in step S703, the historical statistics processing unit 27 determines whether or not there is a route that is identical to the similar route that is extracted in the above-described step S403 within the source driving history information (route) that is accumulated by the driving history accumulation unit 26 (hereinafter also referred to as the identical route). Then, if the historical statistics processing unit 27 determines that there is an identical route (step S703=Yes), the operation proceeds to step S704. On the other hand, if the historical statistics processing unit 27 determines that there is no identical route (step S703=No), the operation proceeds to step S706. An identical route may be any route that can be determined to be identical to the similar route that is extracted in the above-described step S403, and there may be discrepancies as long as these are determined to be within the error range amount.

When a determination is made that there is an identical route in step S703, the operation proceeds to step S704; in step S704, the historical statistics processing unit 27 extracts the power that was consumed when driving the identical route from the source driving history information that is accumulated by the driving history accumulation unit 26. Next, the historical statistics processing unit 27 sets the extracted power consumption as the power consumption to be corrected.

The operation then proceeds to step S705, and the historical statistics processing unit 27 corrects the power consumption that is calculated in steps S407, S412, or S413 described above, based on the power consumption for correction calculated in the above-described step S704. Examples of a method for correcting the power consumption include a method for replacing the power consumption with the power consumption for correction, a method for calculating the average value of the power consumption and the power consumption for correction, and a method for using the difference c between the power consumption b and the power consumption for correction a and expressing this as a±c. Next, the historical statistics processing unit 27 sets the power consumption that has been corrected as the corrected power consumption, after which the power consumption correction operation ends. The historical statistics processing unit 27 thereby makes a correction using the power that was consumed when driving the identical route and transmits (provides) the corrected power consumption to the source terminal device 2 when there is an identical route within the source driving history information that is accumulated by the driving history accumulation unit 26.

On the other hand, when a determination is made that there is no identical route in step S703 described above, the operation proceeds to step S706; in step S706, the historical statistics processing unit 27 determines whether or not there is a similar type of route within the source driving history information (route) that is accumulated by the driving history accumulation unit 26. A similar type of route may be, for example, a route that has the identical or a similar road type as the presentation route (the similar route, the composite route) that is extracted in steps S403 or S408 described above. If a presentation route could not be extracted in the steps S403, S408 described above, the planned route that is searched for in the above-described step S401 is set as a similar type of route. Then, if the historical statistics processing unit 27 determines that there is a similar type route (step S706=Yes), the operation proceeds to step S707. On the other hand, if the historical statistics processing unit 27 determines that there is no similar type of route (step S706=No), the operation proceeds to step S710.

When a determination is made that there is a similar type of route in step S706, the operation proceeds to step S707; in step S707, the historical statistics processing unit 27 calculates the power consumption per unit of distance for the similar type of route (hereinafter also referred to as the similar type of power consumption rate) by referencing the source driving history information that is accumulated by the driving history accumulation unit 26.

The operation then proceeds to step S708, and the historical statistics processing unit 27 multiplies the similar type of power consumption rate calculated in the step S707 described above by the total length of the planned route. Then, the historical statistics processing unit 27 sets the product as the power consumption for correction.

The operation then proceeds to step S709, and the historical statistics processing unit 27 corrects the power consumption that is calculated in steps S407, S412, or S413 described above, based on the power consumption for correction calculated in the above-described step S708. The method for correcting the power consumption may be the same method as the above-described step S705. Next, the historical statistics processing unit 27 sets the power consumption that has been corrected as the corrected power consumption, after which the power consumption correction operation ends. The historical statistics processing unit 27 thereby corrects the power consumption using the similar type of power consumption rate and transmits (provides) the corrected power consumption to the source terminal device 2 when there is a similar type of route within the source driving history information that is accumulated by the driving history accumulation unit 26.

On the other hand, when a determination is made that there is no similar type of route in step S706 described above, the operation proceeds to step S710; in step S710, the historical statistics processing unit 27 determines whether or not there is a route of a similar distance within the source driving history information (route) that is accumulated by the driving history accumulation unit 26. A route of a similar distance may be, for example, a route that has the identical or a similar total length as the presentation route (the similar route, the composite route) that is extracted in steps S403 or S408 described above. If a presentation route could not be extracted in the steps S403, S408 described above, the planned route that is searched for in the above-described step S401 is set as a route of a similar distance. For example, the historical statistics processing unit 27 determines whether or not there is a route with a difference in the total length, when compared to the presentation route, that is less than a predetermined value (for example, ±100 m) within the source driving history information (route) that is accumulated by the driving history accumulation unit 26. Then, if the historical statistics processing unit 27 determines that there is a route of a similar distance (step S710=Yes), the operation proceeds to step S711. On the other hand, if the historical statistics processing unit 27 determines that there is not a route of a similar distance (step S710=No), the operation proceeds to step S714.

When a determination is made that there is a route of a similar distance in step S710, the operation proceeds to step S711; in step S711, the historical statistics processing unit 27 calculates the power consumption per unit of distance of the route of a similar distance (hereinafter also referred to as the similar distance power consumption rate) by referencing the source driving history information that is accumulated by the driving history accumulation unit 26.

The operation then proceeds to step S712, and the historical statistics processing unit 27 multiplies the similar distance power consumption rate calculated in the step S711 described above by the total length of the planned route. Then, the historical statistics processing unit 27 sets the product as the power consumption for correction.

The operation then proceeds to step S713, and the historical statistics processing unit 27 corrects the power consumption that is calculated in steps S407, S412, or S413 described above, based on the power consumption for correction calculated in the above-described step S712. The method for correcting the power consumption may be the same method as that described in the above step S705. Next, the historical statistics processing unit 27 sets the power consumption that has been corrected as the corrected power consumption, after which the power consumption correction operation ends. The historical statistics processing unit 27 thereby corrects the power consumption using the similar distance power consumption rate and transmits (provides) the corrected power consumption to the source terminal device 2 when there is a route of a similar distance within the source driving history information that is accumulated by the driving history accumulation unit 26.

On the other hand, when a determination is made that there is not a route of a similar distance in step S710 described above, the operation proceeds to step S714; in step S714, the historical statistics processing unit 27 determines whether or not there is a similar average speed route within the source driving history information (route) that is accumulated by the driving history accumulation unit 26. A similar average speed route may be, for example, a route that has the identical or a similar average speed as the presentation route (the similar route, the composite route) that is extracted in steps S403 or S408 described above. If a presentation route could not be extracted in the steps S403, S408 described above, the planned route that is searched for in the above-described step S401 is set to be the similar average speed route. For example, the historical statistics processing unit 27 determines whether or not there is a route with a difference in the average speed, when compared to the presentation route, that is less than a predetermined value (for example, ±5 km/h) within the source driving history information (route) that is accumulated by the driving history accumulation unit 26. Then, if the historical statistics processing unit 27 determines that there is a similar average speed route (step S714=Yes), the operation proceeds to step S715. On the other hand, if the historical statistics processing unit 27 determines that there is not a similar average speed route (step S714=No), the operation proceeds to step S718.

When a determination is made that there is a similar average speed route in step S714, the operation proceeds to step S715; in step S715, the historical statistics processing unit 27 calculates the power consumption per unit of distance of the similar average speed route (hereinafter also referred to as the similar average speed power consumption rate) by referencing the source driving history information that is accumulated by the driving history accumulation unit 26.

The operation then proceeds to step S716, and the historical statistics processing unit 27 multiplies the similar average speed power consumption rate calculated in the step S715 described above by the total length of the planned route. Then, the historical statistics processing unit 27 sets the product as the power consumption for correction.

The operation then proceeds to step S717, and the historical statistics processing unit 27 corrects the power consumption that is calculated in steps S407, S412, or S413 described above, based on the power consumption for correction calculated in the above-described step S716. The method for correcting the power consumption may be the same method as that described in the above step S705. Next, the historical statistics processing unit 27 sets the power consumption that has been corrected as the corrected power consumption, after which the power consumption correction operation ends. The historical statistics processing unit 27 thereby corrects the power consumption using the similar average vehicle speed power consumption rate and transmits (provides) the corrected power consumption to the source terminal device 2 when there is a similar average speed route within the source driving history information that is accumulated by the driving history accumulation unit 26.

On the other hand, when a determination is made that there is not a similar average speed route in step S714, the operation proceeds to step S718; in step S718, the historical statistics processing unit 27 calculates the average value of the power consumption per unit of distance for all of the routes of the source driving history information (hereinafter also referred to as the average power consumption rate) by referencing the source driving history information that is accumulated by the driving history accumulation unit 26.

The operation then proceeds to step S719, and the historical statistics processing unit 27 multiplies the average power consumption rate calculated in the step S718 described above by the total length of the planned route. Then, the historical statistics processing unit 27 sets the product as the power consumption for correction.

The operation then proceeds to step S720, and the historical statistics processing unit 27 corrects the power consumption that is calculated in steps S407, S412, or S413 described above, based on the power consumption for correction calculated in the above-described step S719. The method for correcting the power consumption may be the same method as that described in the above step S705. Next, the historical statistics processing unit 27 sets the power consumption that has been corrected as the corrected power consumption, after which the power consumption correction operation ends. The historical statistics processing unit 27 thereby corrects the power consumption using the average power consumption rate and transmits (provides) the corrected power consumption to the source terminal device 2 when all of the determinations of steps S703, S706, S710, and S714 described above are "NO."

In this way, in the present embodiment, the historical statistics processing unit 27 calculates the power that is consumed when driving the searched planned route, based on the first piece of driving history information from a specified driver, among the first pieces of driving history information accumulated by the driving history accumulation unit 26. The historical statistics processing unit 27 then corrects the extracted power consumption, based on the calculated power consumption. Next, the historical statistics processing unit 27 provides information regarding the corrected power consumption. For this reason, acquiring a power consumption that considers the driving characteristics of the driver is possible. As a result, providing more appropriate power consumption information is possible.

As described above, in the present embodiment, an information providing device for vehicle 3 sequentially acquires at least one of driving location information, power consumption information and charging location information from a vehicle-mounted device 1, which is installed in a vehicle A that has an electric motor 13 as a drive source, and accumulates this as the driving history information (the first piece of driving history information, the second piece of driving history information). The vehicle information providing device 3 then refers to the accumulated first piece of driving history information, searches for a similar route, which is either identical or similar to a planned route, and sets the detected similar route as a presentation route. Alternatively, a similar composite route is set as the presentation route instead of the similar route. The vehicle information providing device 3 then refers to the accumulated first piece of driving history information and the second piece of driving history information and detects the power that is consumed when driving the set presentation route and charging hubs that will be traversed when driving along the presentation route. The vehicle information providing device 3 provides the information regarding the set presentation route, as well as the determined power consumption and charging hubs. Accordingly, providing power consumption information and charging hub information that are more in accordance with the actual environment is possible.

In the present embodiment, an example was described in which the vehicle information providing device 3 determines (extracts) both the power that was consumed when a vehicle A actually drove a similar route, as well as the charging hubs; however, another configuration may also be used. For example, the vehicle information providing device 3 may be configured to determine at least either the power consumption or the charging hubs. In this case, the vehicle information providing device 3 provides (transmits) only the power consumption or the charging hub information that has been determined, along with the presentation route.

In addition, according to the present embodiment, when a private location $P_P$ determined to pertain to privacy is included in the presentation route when providing the presentation route information, the presentation route information is provided in a form such that routes in the vicinity of such private locations $P_P$ cannot be identified. Consequently, according to the present embodiment, providing the power consumption information and the charging hub information that are in line with the actual environment while keeping private locations $P_P$ unknown is possible.

According to the present embodiment, when a determination is made that all of the similar routes or similar composite routes extracted as the presentation routes are comprised of only routes from a single vehicle or are equal to or less than a predetermined number set in advance, the extracted similar routes or similar composite routes are determined to be private routes and are determined not to comprise presentation routes (steps S405, S410 described above). That is, in this case, the configuration is such that information regarding the similar route or the similar composite route is not provided. Thus, according to the present embodiment, more appropriately protecting private information for each driver is possible by not disclosing such a route that is determined to be private.

Embodiments of the present invention were described above, but these embodiments have been described in order to facilitate an understanding of the present invention and are not described in order to limit the present invention. Therefore, the elements disclosed in the embodiments above are intended to include all design modifications and equivalents thereto that lie within the technical range of the present invention.

Figure 13:
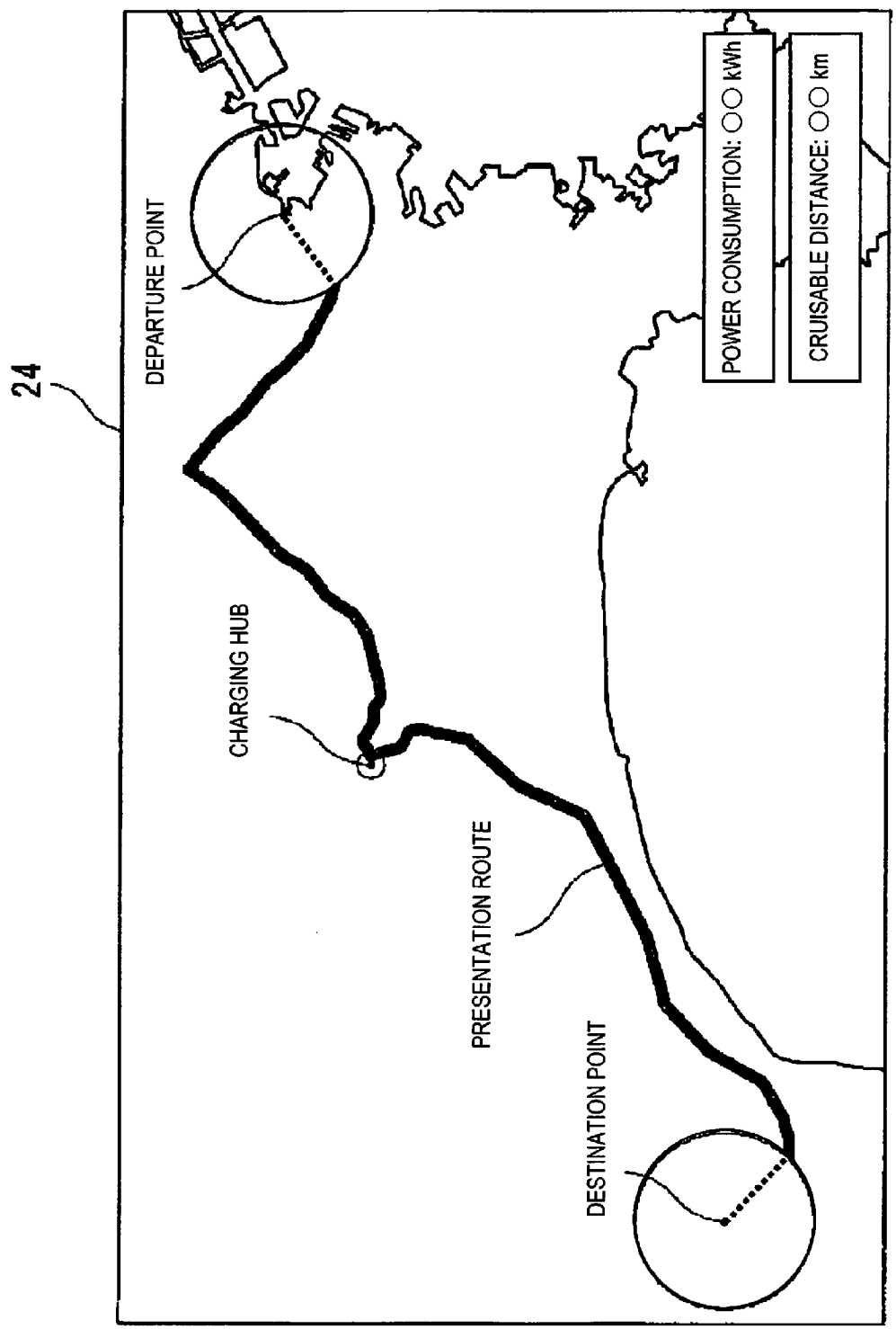
FIG. 13 is a view illustrating one example of content displayed by the display unit when conducting the private location protection operation.
Figure 19:
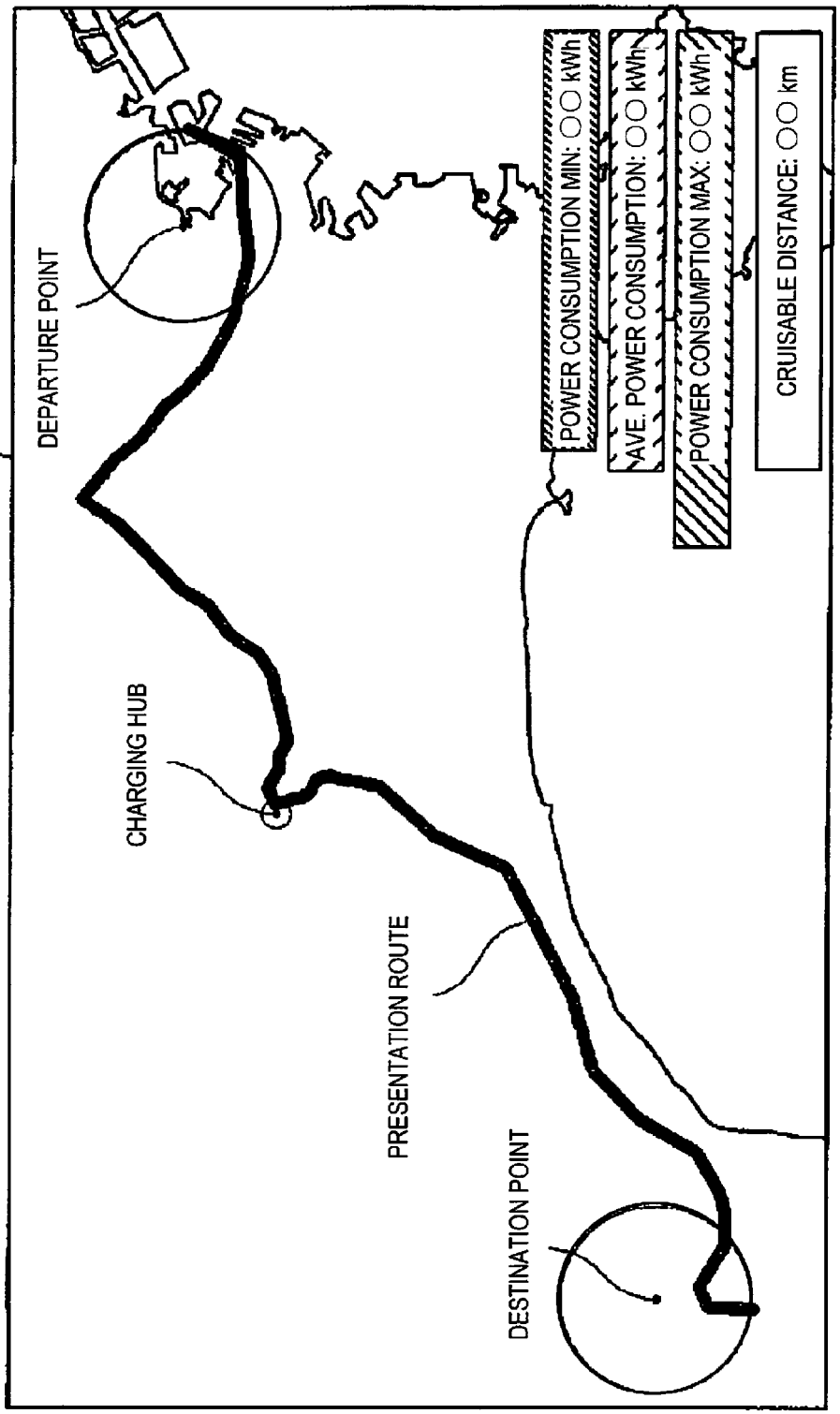
FIG. 19 is a view illustrating another example of contents displayed by the display unit.

For example, in the above-described embodiment, the historical statistics processing unit 27 may be configured to refer to the first piece of driving history information that is accumulated by the driving history accumulation unit 26 and to determine the power consumption when driving along the presentation route (the similar route, the similar composite route) for each driver. In this case, the historical statistics processing unit 27 transmits (provides) to the source terminal device 2 information regarding the maximum power consumption, the minimum power consumption, and the average power consumption, based on the determined power consumption for each driver, along with information regarding the presentation route and the charging hubs. The source terminal device 2 thereby displays on the display screen the maximum power consumption (the power consumption MAX), the minimum power consumption (the power consumption MIN), and the average power consumption (the average power consumption), in addition to the presentation route and the charging hubs, based on the received information, as illustrated in FIG. 19. Even in this case, if a private location $P_P$ is included in the presentation route, the display is provided in a form such that the routes in the vicinity of the private location $P_P$ cannot be identified in the same way as in FIG. 13 and FIG. 14. In particular, according to this type of configuration, the power consumption when driving along the presentation route is calculated for each driver, and the maximum power consumption, the minimum power consumption, and the average power consumption of the calculated power consumption are provided. Accordingly, the user can obtain the degree of variation in the power consumption for each driver.

Figure 20:
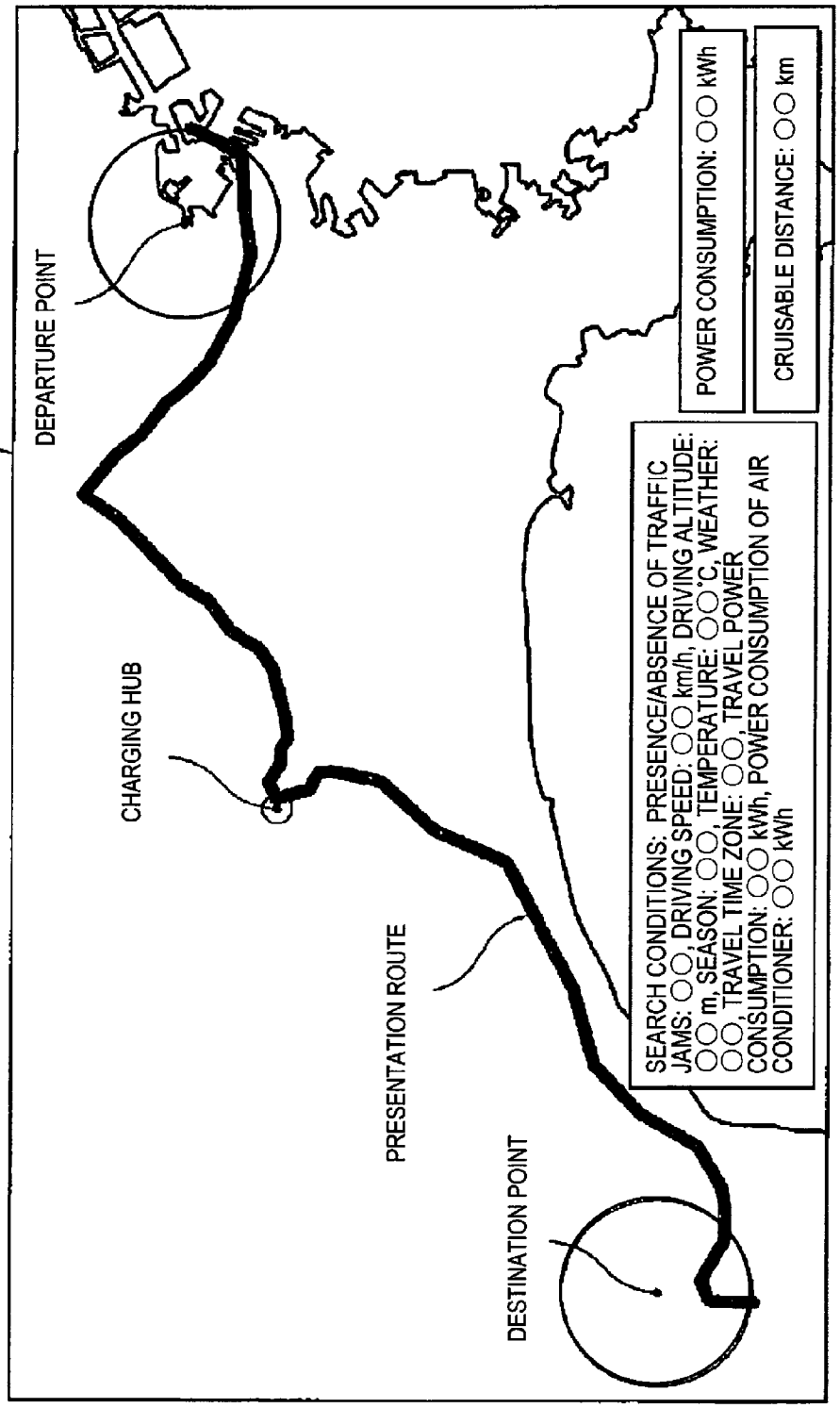
FIG. 20 is a view illustrating another example of contents displayed by the display unit.

Additionally, in the embodiment described above, an example was described in which the display unit 24 displays the power consumption and the charging hubs along with the presentation route (the similar route, the similar composite route); however, another configuration may also be used. For example, the display unit 24 may be configured to display information regarding the presence/absence of traffic jams, the driving speed, the driving altitude, the season, the temperature, the weather, the travel time zone, the travel power consumption, and the power consumption by the air conditioner, which are included in the first piece of driving history information and the second piece of driving history information and are used for the extraction of the power consumption and the charging hub information. Specifically, the terminal device 2 receives an input of at least the presence/absence of traffic jams, the driving speed, the driving altitude, the season, the temperature, the weather, the travel time zone, the travel power consumption, or the power consumption by the air conditioner (hereinafter also referred to as the state quantity for search). Next, the terminal device 2 transmits the received information regarding the state quantity for search to the vehicle information providing device 3. Subsequently, when information that is transmitted by the terminal device 2 is received, the vehicle information providing device 3 (the historical statistics processing unit 27) acquires the search condition state quantity from the received information. The historical statistics processing unit 27 then determines the power that has been consumed when driving along the selected presentation route, as well as the charging hubs that will be traversed when driving along the presentation route, by referencing the driving history information conforming to the acquired search condition from among the driving history information that is accumulated by the driving history accumulation unit 26. Then, the historical statistics processing unit 27 transmits (provides) the acquired search condition information to the source terminal device 2, along with information regarding the presentation route (the similar route, the similar composite route), the power consumption, and the charging hubs. The source terminal device 2 thereby displays on the display screen the search condition used for determining the power consumption and the charging hubs, in addition to the presentation route, the power consumption, and the charging hubs, based on the received information, as illustrated in FIG. 20. Even in this case, if a private location $P_P$ is included in the presentation route, the display is presented in a form such that the routes in the vicinity of the private location $P_P$ cannot be identified, in the same way as in FIG. 13 and FIG. 14. According to this kind of configuration, the search conditions used for determining the power consumption and the charging hubs are provided along with the presentation route, the power consumption, and the charging hubs. Accordingly, user can obtain the search conditions used for determining the power consumption and the charging hubs.

Additionally, the example described above was configured so that, when a route including a private location Pp is detected as the presentation route (the similar route, the similar composite route), the display is presented in a form such that a route in the vicinity of the private location $P_P$ cannot be identified; however, the configuration may also be such that the display is not presented in regards to a presentation route (the similar route, the similar composite route) that includes a private location $P_P$, and a route that is identical or similar to the above and that does not include a private location $P_P$ is searched for and set as the presentation route (the similar route, the similar composite route). Alternatively, the configuration can be such that a plurality of presentation routes (the similar routes, the similar composite routes) are extracted; when there are presentation routes that include private locations $P_P$ and presentation routes that do not include private locations $P_P$, only information regarding the presentation routes that do not include private locations $P_P$ are provided. In particular, according to these methods, the presentation routes (the similar routes, the similar composite routes) that include private locations $P_P$ are excluded from the subject of information provided; as a result, further heightening the level of privacy protection is possible.

In the embodiment described above, there is also the possibility of employing a configuration in which the extent of the departure point range $R_O$ and the destination point range $R_D$ are changed according to the distance between the departure point $P_O$ and the destination point $P_D$ (made to be larger as the distance increases) or in which the size of the departure point range $R_O$ and the destination point range $R_D$ are changed according to the time required to travel from the departure point $P_O$ to the destination point $P_D$ (the travel time) (made to be larger as the required time increases).

In the above-described embodiment, the driving history accumulation unit 26 of the vehicle information providing device 3 corresponds to the history information accumulation unit, the private location detection unit, and the composite route generation unit of the present invention; the historical statistics processing unit 27 of vehicle information providing device 3 corresponds to the planned route acquisition unit, the presentation route decision unit, the privacy determination unit, the presentation route determination unit, the presentation information determination unit, and the presentation information provision unit of the present invention.

The invention claimed is:

1. A vehicle information providing device comprising:
   a history information accumulation unit that sequentially acquires at least one of driving location information, power consumption information and charging location information from vehicle-mounted devices installed on a plurality of vehicles that each have an electric motor as a drive source and accumulates this as driving history information;
   a private location detection unit that detects a private location determined to pertain to privacy along a route that each of the vehicle drives by referencing the driving history information that is accumulated by the history information accumulation unit;
   a planned route acquisition unit that acquires a planned route from a departure point to a destination point;
   a presentation route determination unit that determines a presentation route that is identical or similar to the planned route that is acquired by the planned route acquisition unit by referencing the driving history information that is accumulated by the history information accumulation unit;
   a privacy determination unit that determines whether or not a presentation route determined by the presentation route determination unit includes one or more private locations;
   a presentation information determination unit that determines at least one of the power that is consumed when driving along the presentation route determined by the presentation route determination unit and charging hubs that will be traversed when driving along the presentation route determined by the presentation route determination unit; and
   a presentation information provision unit that provides information regarding the presentation route, the determination results of the presentation route determination unit, and the determination results of the presentation information determination unit; wherein
   when the presentation route is determined to include at least one of the private locations, the presentation information provision unit provides information regarding the presentation route in a form such that routes in a vicinity of the private location cannot be identified.

2. The vehicle information providing device as recited in claim 1, wherein
   when the presentation route is determined to include at least one of the private locations, the presentation information provision unit provides information regarding the presentation route in a form such that the routes in the vicinity of the private location and the routes that are within a predetermined distance range from the departure point or the destination point cannot be identified.

3. The vehicle information providing device as recited in claim 1, wherein
   when the presentation route is determined to include at least one of the private locations, the presentation information provision unit provides information regarding the presentation route in a form such that routes that are within a predetermined distance range from the private location cannot be identified.

4. The vehicle information providing device as recited in claim 1, wherein
   the privacy determination unit detects locations at which a stay frequency or a stay time is equal to or greater than a predetermined threshold for each of the vehicles by referencing the driving history information that is accumulated by the history information accumulation unit and determines the locations to be one of the private locations.

5. The vehicle information providing device as recited in claim 1, wherein
   the privacy determination unit detects U-turn locations for each of the vehicles by referencing the driving history information that is accumulated by the history information accumulation unit and determines the U-turn locations to be one of the private locations.

6. The vehicle information providing device as recited in claim 1, further comprising:
   a composite route generation unit that generates one or more composite routes by combining a plurality of routes that are driven by the same vehicle by referencing the driving history information that is accumulated by the history information accumulation unit,
   the private location detection unit is configured to detect the private locations in the composite routes that are generated by the composite route generation unit by referencing the driving history information that is accumulated by the history information accumulation unit, and
   the presentation route determination unit searches for a composite route of the composite routes that is identical or similar to the planned route that is acquired by the planned route acquisition unit from the composite routes that are generated by the composite route generation unit and determines the searched composite route to be a presentation route.

7. The vehicle information providing device as recited in claim 1, wherein
when a determination is made that the determined presentation route includes at least one of the private locations, the presentation route determination unit searches for a route that is identical or similar to the determined presentation route and that does not include one of the private locations by referencing the driving history information that is accumulated by the history information accumulation unit and determines the searched route to be a presentation route instead of the presentation route that is determined to include the private location.

8. The vehicle information providing device as recited in claim 1, wherein
when the number of routes that are identical or similar to the presentation route, which is determined by the presentation route determination unit, is equal to or less than a predetermined number, or when the presentation routes that are identical or similar to the presentation route, which is determined by the presentation route determination unit, are routes from only a single vehicle, the presentation information provision unit does not provide the information.

* * * * *